United States Patent
Motoishi et al.

(10) Patent No.: US 12,294,267 B2
(45) Date of Patent: May 6, 2025

(54) ELECTRIC ROTATING MACHINE APPARATUS AND ELECTRIC POWER STEERING APPARATUS

(71) Applicant: Mitsubishi Electric Corporation, Tokyo (JP)

(72) Inventors: Naohiro Motoishi, Tokyo (JP); Takahisa Kawaguchi, Tokyo (JP); Kentaro Urimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 301 days.

(21) Appl. No.: 18/015,795

(22) PCT Filed: Aug. 17, 2020

(86) PCT No.: PCT/JP2020/030946
§ 371 (c)(1),
(2) Date: Jan. 12, 2023

(87) PCT Pub. No.: WO2022/038650
PCT Pub. Date: Feb. 24, 2022

(65) Prior Publication Data
US 2023/0318387 A1    Oct. 5, 2023

(51) Int. Cl.
| | |
|---|---|
| *H02K 3/50* | (2006.01) |
| *B62D 5/04* | (2006.01) |
| *H02K 9/22* | (2006.01) |
| *H02K 11/01* | (2016.01) |
| *H02K 11/33* | (2016.01) |

(52) U.S. Cl.
CPC .............. *H02K 3/50* (2013.01); *B62D 5/0406* (2013.01); *H02K 9/227* (2021.01); *H02K 11/0141* (2020.08); *H02K 11/33* (2016.01); *H02K 2203/09* (2013.01); *H02K 2211/03* (2013.01)

(58) Field of Classification Search
None
See application file for complete search history.

(56) References Cited

U.S. PATENT DOCUMENTS

| | | | | |
|---|---|---|---|---|
| 12,184,128 B2 * | 12/2024 | Suzuki | .................. | H02K 11/33 |
| 2019/0036415 A1 * | 1/2019 | Kataoka | ................ | H01R 13/50 |

FOREIGN PATENT DOCUMENTS

| | | | | |
|---|---|---|---|---|
| JP | 2018061423 A | * | 4/2018 | ............. B62D 5/065 |
| WO | WO-2019064423 A1 | * | 4/2019 | ........... B62D 5/0406 |

OTHER PUBLICATIONS

International Search Report for PCT/JP2020/030946, dated Oct. 27, 2020.

* cited by examiner

*Primary Examiner* — Bernard Rojas
(74) *Attorney, Agent, or Firm* — Sughrue Mion, PLLC

(57) ABSTRACT

The objective of the present disclosure is to realize downsizing of the bus-bar holder, and then to downsize an electric rotating machine apparatus and an electric power steering apparatus. In a first protruding portion of the bus-bar holder, there are provided a columnar portion, two or more first ribs that are provided on an outer circumferential surface of the columnar portion in such a way as to be parallel with a center axis of the columnar portion and in such a way as to be spaced apart from one another, and two or more second ribs; the first rib makes contact with an inner circumference surface of a first through hole of the control circuit board; the second rib makes contact with an inner circumference surface of a second through hole of the bus bar.

18 Claims, 21 Drawing Sheets

ELECTRIC ROTATING MACHINE APPARATUS AND ELECTRIC POWER STEERING APPARATUS

CROSS REFERENCE TO RELATED APPLICATIONS

This application is a National Stage of International Application No. PCT/JP2020/030946 filed Aug. 17, 2020.

TECHNICAL FIELD

The present disclosure relates to an electric rotating machine apparatus and an electric power steering apparatus.

BACKGROUND ART

To date, there has existed an electric rotating machine apparatus in which a control unit is integrated with an electric rotating machine in such a way as to be adjacent to the electric rotating machine in an axial direction of the rotation axle thereof. A stator, a rotor, and the like are incorporated in the housing of the electric rotating machine. The control unit is provided adjacent to the electric rotating machine in the axial direction thereof; the control unit has a control circuit board on which an inverter for making currents flow in stator windings and a control circuit for controlling the inverter are mounted. The electric rotating machine apparatus has a bus bar for making an electric current flow and a bus-bar holder that holds the bus bar.

There is known an electric power steering apparatus in which in order to fix a bus bar, a bus-bar holder is provided with a protruding portion and in which a through hole is provided in the bus bar and then the protruding portion is press-fitted into the through hole so that the bus bar is held by the holder. The protruding portion has a columnar portion and two or more ribs provided on the outer circumferential surface of the columnar portion in such a way as to be in parallel with the center axis of the columnar portion. The respective ribs make contact with the inner surface of the through hole in the bus bar (for example, Patent Document 1).

CITATION LIST

Patent Literature

Patent Document 1: Japanese Patent Application Laid-Open No. 2018-061423

The protruding portion of the bus-bar holder disclosed in Patent Document 1 is a structure for attaching the bus bar to the bus-bar holder; fixation of other components is not described in Patent Document 1. A case may occur where inside a control unit, a bus-bar holder holding a bus bar is made to additionally hold other components such as a circuit board and the like. In this situation, it is required that a new protruding portion is provided in the bus-bar holder and the circuit board is provided with a through hole corresponding to the new protruding portion.

Provision of the new protruding portion enlarges the bus-bar holder. In addition, it is required that the circuit board is provided with a through hole for avoiding the protruding portion for making the bus-bar holder hold the bus bar, in addition to the through hole for making the bus-bar holder hold the circuit board. Accordingly, the area of the through holes on the control circuit board increases; thus, the mounting area of wiring leads and electronic components on the control circuit board decreases. In order to secure a necessary mounting area of the wiring leads and the electronic components, the total board area increases, eventually. As a result, the increase in the total board area becomes a contributing factor that hinders downsizing and cost saving of the electric rotating machine.

SUMMARY OF INVENTION

Accordingly, the objective of the present disclosure is to dispense with any additional protruding portion to be provided at a time when the circuit board is assembled with the bus-bar holder holding the bus bar, to realize downsizing and cost-saving of the bus-bar holder and circuit board, and then to realize downsizing and cost-saving of the electric rotating machine apparatus.

In addition, the objective thereof is to realize downsizing and cost-saving of a power steering apparatus provided with the foregoing electric rotating machine apparatus.

Solution to Problem

An electric rotating machine apparatus according to the present disclosure includes
  an electric rotating machine having a rotation axle,
  a circuit board that is disposed at one axial-direction side of the rotation axle with respect to the electric rotating machine and has a first through hole,
  a bus bar that has a second through hole and is provided in such a way that one surface thereof makes contact with one surface of the circuit board, and
  a bus-bar holder that is provided in contact with the other surface of the bus bar and has a protruding portion that penetrates the first through hole and the second through hole; the protruding portion is provided with
  a columnar portion,
  two or more first ribs that are provided on an outer circumferential surface of the columnar portion in such a way as to be parallel with a center axis of the columnar portion and in such a way as to be spaced apart from one another, and
  two or more second ribs that are provided on an outer circumferential surface of the columnar portion in such a way as to be parallel with a center axis of the columnar portion and in such a way as to be spaced apart from one another; the first ribs abut on an inner circumferential surface of the first through hole in the circuit board and the second ribs abut on an inner circumferential surface of the second through hole in the bus bar.

An electric power steering apparatus according to the present disclosure includes the foregoing electric rotating machine apparatus.

Advantage of the Invention

An electric rotating machine apparatus according to the present disclosure can dispense with any additional protruding portion to be provided at a time when the circuit board is assembled to the bus-bar holder holding the bus bar. Accordingly, it is made possible to perform downsizing and cost reduction of the bus-bar holder and the circuit board; thus, downsizing and cost reduction of the electric rotating machine apparatus can be achieved.

In addition, there can be achieved downsizing and cost reduction of an electric power steering apparatus equipped with the electric rotating machine apparatus according to the present disclosure.

DESCRIPTION OF EMBODIMENTS

Hereinafter, embodiments of the present disclosure will be explained with reference to the drawings.

1. Embodiment 1

<Circuit Configuration>

Figure 1:
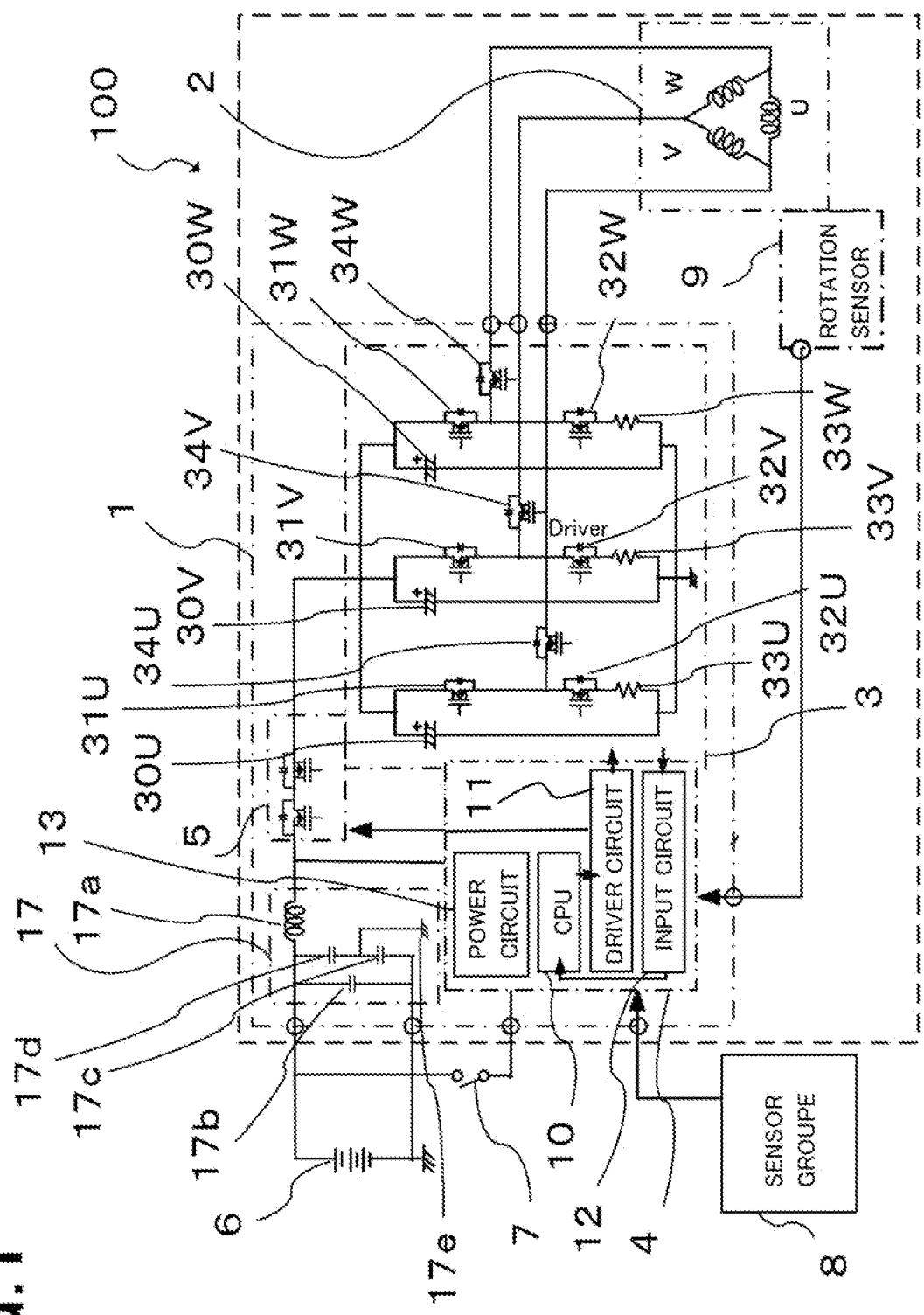
FIG. 1 is a circuit diagram of an electric rotating machine apparatus according to Embodiment 1.

In FIG. 1, the circuit diagram of an electric rotating machine apparatus 100 represents a control unit 1 and an electric rotating machine 2. The electric rotating machine apparatus 100 may be either the one in which a control circuit and a Y-connected or delta-connected three-phase brushless electric rotating machine 2 are integrated with each other or the one that has a function of utilizing regenerative electric power, generated by driving a load, for charging a battery. The electric rotating machine apparatus 100 is utilized not only in an electric power steering apparatus 150 but also in various uses including vehicle-wheel driving.

The control unit 1 includes an inverter circuit 3 for supplying an electric current to the electric rotating machine 2, a control circuit unit 4 in which a CPU (Central Processing Unit) 10 is mounted, a power-relay switching device 5, and a filter unit 17. The filter unit 17 is provided for suppressing noise generated by the inverter circuit 3.

The filter unit 17 is connected with a power source and a grounding terminal from a battery 6 mounted in a vehicle. The power source is provided to a power-source circuit 13 in the control circuit unit 4 through an ignition switch 7. A sensor group 8 is connected with an input circuit 12 in the control circuit unit 4. The sensor group includes, for example, a steering angle sensor that is mounted close to a steering wheel and detects a steering angle, a torque sensor for detecting steering torque, and a speed sensor for detecting a vehicle traveling speed. A signal from the power-source circuit 13 makes the power source travel through the filter unit 17 and the power-relay switching device 5; then, the power source becomes a current source for the inverter circuit 3. The filter unit 17 includes a coil 17a, an X capacitor 17b, and Y capacitors 17c and 17d. In accordance with noise generated by the electric rotating machine apparatus 100, an unillustrated common mode coil may be added thereto, the coil 17a can be removed, or the number of the capacitors can be reduced.

Information items from the sensor group 8 are transmitted to the CPU 10 by way of the input circuit 12 of the control circuit unit 4. Based on those information items, the CPU 10 calculates and outputs a control amount corresponding to an electric current for making the electric rotating machine 2 rotate. The output signal of the CPU 10 is transmitted to the inverter circuit 3 by way of a driving circuit 11 included in an output circuit. The driving circuit 11 is disposed within the control circuit unit 4, because only a small electric current flows therein; physically, the driving circuit 11 is mounted on a control circuit board 14 along with the CPU 10, the power-source circuit 13, and the input circuit 12. However, the driving circuit 11 can also be disposed within a power module 35 along with the inverter circuit 3.

The inverter circuit 3 includes upper-arm switching devices 31U, 31V, and 31W and lower-arm switching devices 32U, 32V, and 32W for three-phase windings U, V, and W of the electric rotating machine 2 and electric-rotating-machine relay switching devices 34U, 34V, and 34W for connecting/disconnecting wiring leads between the windings of the electric rotating machine 2 and the inverter circuit 3. The inverter circuit 3 further includes current-detection shunt resistors 33U, 33V, and 33W and smoothing capacitors 30U, 30V, and 30W. Because having the same circuit configuration for each of the windings of the respective phases, the inverter circuit 3 can supply electric currents independently to the windings of the respective phases.

In addition, although not illustrated, respective electric potential differences across the shunt resistors 33U, 33V, and 33W, winding-terminal voltages of the electric rotating machine 2, and the like are fed back to the input circuit 12. These information items are also inputted to the CPU 10; the first CPU 10 calculates the difference between the calculated current value and a detection value and then performs feedback control so as to supply a desired current for the electric rotating machine 2 and to operate the electric rotating machine 2.

Still moreover, the drive circuit 11 also outputs a drive signal for the power-relay switching device 5 that operates as a relay for connecting or disconnecting a power-source line between the battery 6 and the inverter circuit 3. The power-relay switching device 5 can cut off current supply to the electric rotating machine 2 itself. The electric-rotating-machine relay switching devices 34U, 34V, and 34W are also provided in the inverter circuit 3 and can cut off the respective phases. In addition, a large electric current flows and hence heat is generated in the power-relay switching device 5; thus, it may be allowed that the power-relay switching device 5 is disposed not in the control circuit board 14 but in the power module 35 in which the inverter circuit 3 is incorporated. The control circuit board 14 is a printed circuit board on one side or both sides of which electronic components are mounted.

The CPU 10 has an abnormality detection function of detecting an abnormality in the sensor group 8, the driving circuit 11, the inverter circuit 3, the wirings of the electric rotating machine 2, or the like. When an abnormality is detected, in order to cut off current supply, for example, only for a predetermined phase in accordance with the abnormality, the CPU 10 turns off the corresponding-phase upper-arm switching devices 31U, 31V, and 31W, the corresponding-phase lower-arm switching devices 32U, 32V, 32W, or the corresponding-phase electric-rotating-machine relay switching devices 34U, 34V, 34W. Furthermore, it is also made possible that in order to cut off all the electric currents, the power-relay switching device 5 is turned off so that the power source itself is cut off.

The electric rotating machine 2 is a brushless electric rotating machine in which three-phase windings are delta-connected. Because being a brushless electric rotating machine, the electric rotating machine 2 is provided with a rotation sensor 9 for detecting the rotation position of the rotor. The rotation information is also fed back to the input circuit 12. It may be allowed that the electric rotating machine 2 is not three-phase delta-connected brushless electric rotating machine but either a Y-connected brushless electric rotating machine or an electric rotating machine having dipole-two-pair brushes. Moreover, as is the case with the winding specification of a conventional apparatus, either distributed winding or concentrated winding can be adopted.

Next, the periphery of the filter unit 17 will be explained. PWM (Pulse Width Modulation) control of the inverter circuit 3 in the control unit 1 generates switching noise. The filter unit 17 is provided in order to prevent the switching noise from being transferred from the electric rotating machine apparatus 100 to the outside. The coil 17a is the one for normal-mode noise and is called a "normal mode coil". In addition, although not illustrated, it may be allowed that a coil that is the one for common-mode noise and is called a "common mode coil" is added.

The X capacitor 17b is the one that is called an "across-the-line capacitor" or an "X capacitor". Each of the Y capacitors 17c and 17d is the one that is called a "line-bypass capacitor" or a "Y capacitor". The filter unit 17 suppresses conductive noise and radiation noise by use of these filter elements and is called an "EMI (Electromagnetic Interface) filter". In addition, the middle point 17e between the Y capacitors 17c and 17d is a body ground and is electrically connected with the vehicle body by way of part of the electric rotating machine apparatus 100 so as to be grounded.

<Physical Configuration>

Figure 2:
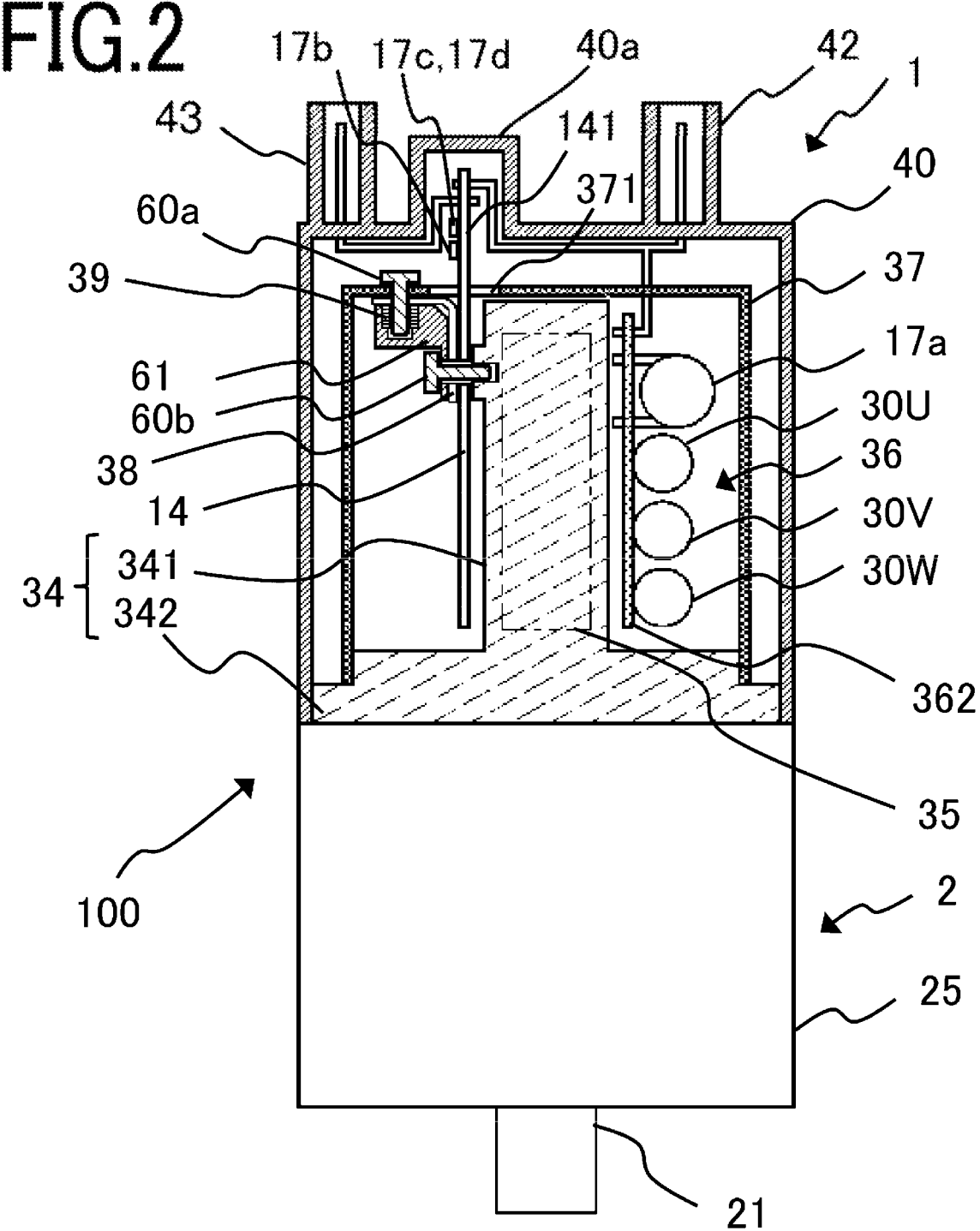
FIG. 2 is a side cross-sectional view of the electric rotating machine apparatus according to Embodiment 1.

FIG. 2 is a side cross-sectional view for explaining the physical configuration of the electric rotating machine apparatus 100 according to Embodiment 1; the control unit 1 is cut at a cross section including the center axis of the electric rotating machine 2. The electric rotating machine 2 disposed at the lower side of FIG. 2 and the control unit 1 disposed at the upper side of FIG. 2 are integrated with and adjacent to each other in the axial direction of the rotation axle 21 of the electric rotating machine 2. As is the case with a conventional apparatus, the electric rotating machine 2 is incorporated in an electric-rotating-machine case 25; in the periphery of the rotation axle 21, there are arranged a rotor in which unillustrated permanent magnets in two or more pole pairs are arranged and a stator that is spaced apart from the rotor and around which windings are wound. The respective windings are wound for the three phases; the end portions of the respective phases extend toward the control unit 1 for the sake of connection (unillustrated).

The top portion and the outer circumference of the control unit 1 are covered with a housing 40; on the top portion of the housing, there are arranged a power-source connector 42 where a relatively large power-source-system current flows and a signal connector 43 where a relatively small signal-system current flows. The power-source connector 42, the signal connector 43, and the housing 40 are integrally molded with one another by means of a resin material.

Figure 3:
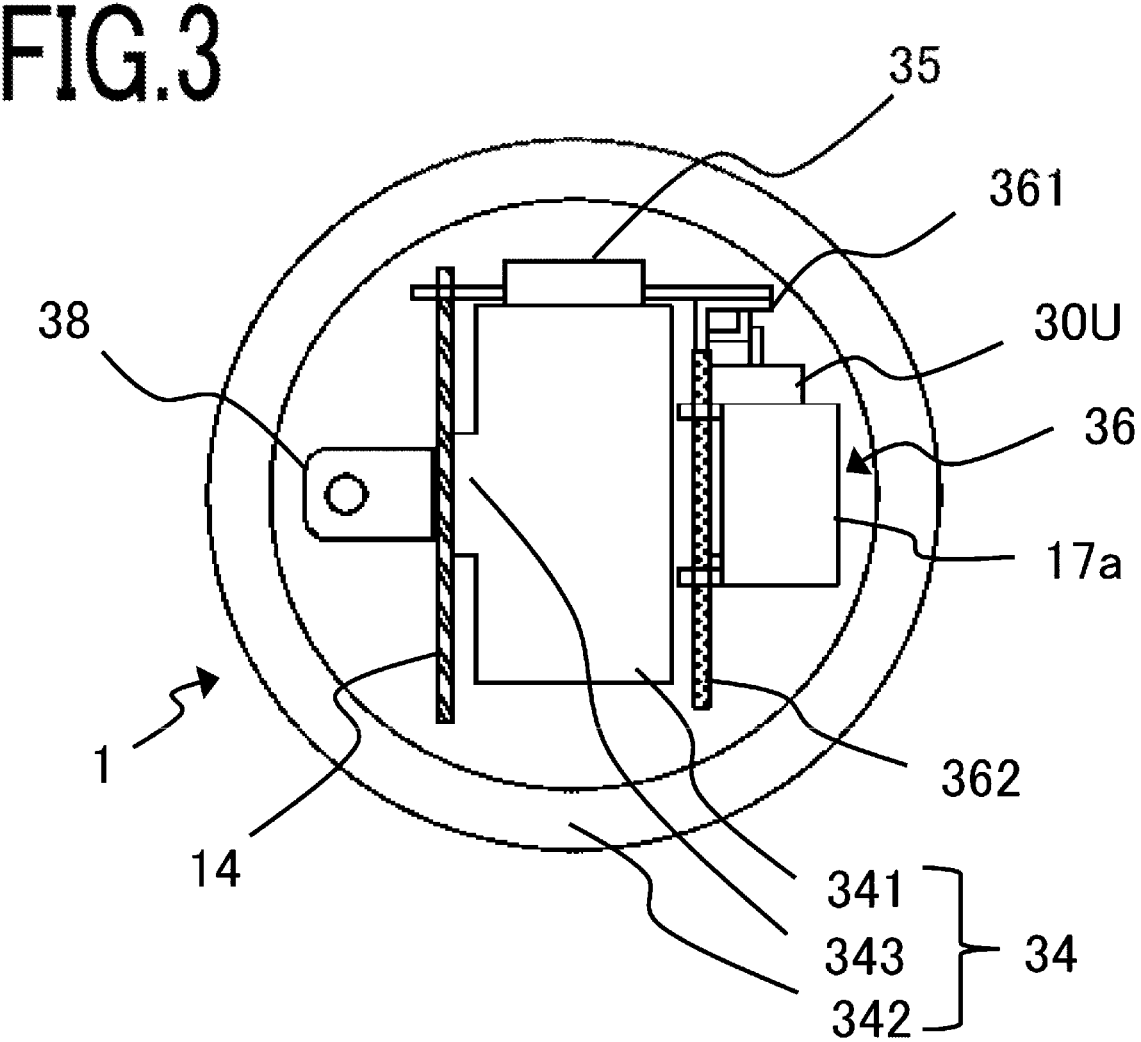
FIG. 3 is a top cross-sectional view of the electric rotating machine apparatus according to Embodiment 1.

FIG. 3 is a top cross-sectional view of the electric rotating machine apparatus 100 according to Embodiment 1; it is a drawing illustrating the control unit 1, when the control unit 1 is cut beneath the ceiling surface of the electromagnetic shield 37 and is viewed from the power-source connector side. In the control unit 1, a heat sink 34 is disposed at the middle portion thereof inside the housing 40.

In the middle of the heat sink 34, there is disposed a columnar portion 341 whose cross section is formed in the shape of a rectangular column. The control circuit board 14 is vertically disposed along the side surface of one of the long sides of the columnar portion 341 of the heat sink 34. A bus bar unit 36 is disposed at the side surface of the other one of the long sides of the columnar portion 341 of the heat sink 34.

The power module 35 is vertically disposed along the side surface of one of the short sides of the columnar portion 341 of the heat sink 34. The power module 35 has a control circuit board connecting terminal at one side thereof along the short side and a bus-bar-unit connecting terminal at the other side thereof. The control circuit board connecting terminal is connected through soldering; the bus-bar-unit connecting terminal is connected through TIG (Tungsten Insert Gas) welding or the like. The power module 35 is provided behind the heat sink and is disposed at the position indicated by a double-dot chain line in FIG. 2.

The heat sink 34 includes the foregoing columnar portion 341 and a ring-shaped base portion 342 fixed to one longitudinal-direction end portion of the columnar portion 341. The columnar portion 341 of the heat sink 34 is disposed in the central portion of the housing 40 in such a way that the longitudinal direction thereof is along the axis line of the housing 40 of the control unit 1. The base portion 342 of the heat sink 34 is supported by the electric-rotating-machine case 25 in such a way that the outer circumferential surface thereof is inscribed in the inner circumferential surface of the electric-rotating-machine case 25. That is to say, the heat sink 34 is disposed in such a way that the base portion 342 thereof is fixed to the electric-rotating-machine case 25 and that the columnar portion 341 supported in a cantilever manner by the base portion 342 protrudes toward the inner space of the housing 40.

An insertion hole is provided in the base portion 342 of the heat sink 34. The respective end portions of the three-phase windings in the electric rotating machine 2 pass through the insertion hole and are connected with the bus bars of the bus bar unit 36 in the control unit 1 (unillustrated).

The base portion 342 of the heat sink 34 is formed in a stepped shape. The electric-rotating-machine case 25 is fixed to the outer circumference of the larger-diameter portion of the base portion 342. The metal and cylindrical tubular electromagnetic shield 37 for suppressing noise emission is fixed to the outer circumference of the smaller-diameter portion of the base portion 342.

The electromagnetic shield 37 is disposed in such a way as to cover the columnar portion 341 of the heat sink 34, the control circuit board 14, the bus bar unit 36, and the power module 35; part of the control circuit board 14 protrudes to the outside of the electromagnetic shield 37 through a through hole 371 in the top portion of the electromagnetic shield 37. In FIG. 2, only the control circuit board 14 protrudes from the through hole 371 in the top portion of the electromagnetic shield 37. However, part of the heat sink 34 or part of the bus bar unit 36 may protrude from the through hole 371.

The bus bar unit 36 includes a bus-bar holder 362 in which a bus bar 361 is embedded in a resin member, the smoothing capacitors 30U, 30V, and 30W, and the coil 17a. The bus bar 361 is connected with the respective end portions of the windings of the three phases of the electric rotating machine 2, the connection terminal of the power module 35, the respective terminals of the smoothing capacitors 30U, 30V, and 30W and the coil 17a, and the respective terminals of the power source and the ground extended from the power-source connector 42.

<Filter Circuit>

The control circuit unit 4, the power-relay switching device 5, and the filter unit 17 in FIG. 1 are mounted on the control circuit board 14. On the control circuit board 14, there are mounted circuit components for controlling the inverter circuit 3 that supplies electric currents to the electric rotating machine 2. The X capacitor 17b and the Y capacitors 17c and 17d included in the filter are arranged on a protruding portion 141, of the control circuit board 14, that protrudes from the through hole 371 in the top portion of the electromagnetic shield 37. In addition, the protruding portion 141 of the control circuit board 14 is connected with respective external connection terminals, of the power source and the ground, that extend from the power-source connector 42; the filter unit 17 prevents noise from leaking out to the outside through these connection terminals. In FIG. 2, the X capacitor and the Y capacitors are arranged on the outer circumferential side of the protruding portion 141; however, the X capacitor and the Y capacitors may be arranged on the inner circumferential side of the protruding portion 141. In addition, in the foregoing explanation, the coil 17a is disposed on the bus bar unit 36; however, the normal mode coil 17a may be disposed on the protruding portion 141. Because it is not required to provide a board dedicated to the filter circuit or a circuit-supporting structure dedicated to the filter circuit, the control unit can be configured compactly and inexpensively. These components are incorporated in the housing 40 so as to be protected. Because being incorporated in the housing 40, the components can escape from being broken; thus, the electric rotating machine apparatus 100 can readily be handled.

In Embodiment 1, because the X capacitor 17b and the Y capacitors 17c and 17d of the filter circuit are arranged on the top portion of the control circuit board 14, it is not required to provide a board dedicated to the filter circuit or a circuit-supporting structure dedicated to the filter circuit; therefore, the control unit can be configured compactly and inexpensively. In addition, effective noise countermeasures can be made by providing the filter unit 17 having noise-removal capability, outside the through hole 371 in the electromagnetic shield 37. Because the X capacitor and the Y capacitors are grounded not through the heat sink 34 close to the power module and the paths thereof, which are noise sources, but through the electromagnetic shield 37, noise can be suppressed.

Moreover, because being disposed in a concave portion inside a convex portion 40a provided in the top portion of the housing 40, the protruding portion 141 suppresses the electric rotating machine apparatus 100 from being upsized. In other words, because the ceiling surface of the housing 40 of the control unit 1 in the electric rotating machine apparatus 100, except for the convex portions such as the convex portion 40a, the power-source connector 42, and the signal connector 43, can be kept compact, the downsizing can successfully be realized.

<Grounding Bus Bar>

An L-shaped grounding bus bar 38 is disposed along the outer circumferential side of the control circuit board 14 and the lower side of the ceiling surface of the electromagnetic shield 37.

Figure 4:
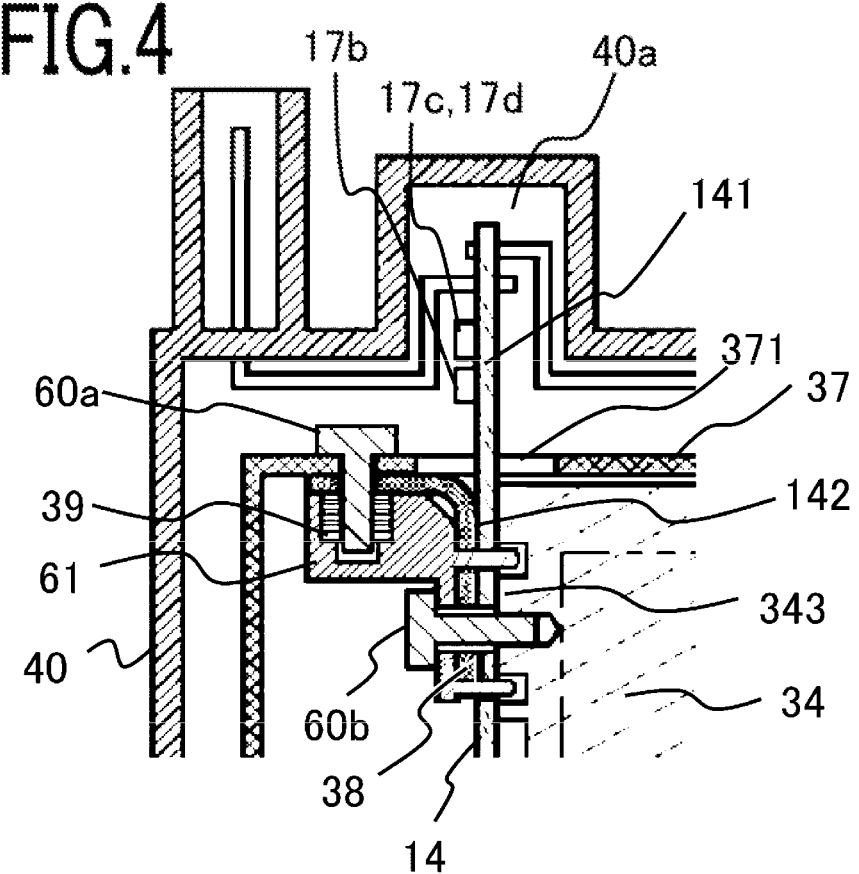
FIG. 4 is an enlarged view of a cross section of the electric rotating machine apparatus according to Embodiment 1.

FIG. 4 is an enlarged view of a side cross section, taken along the center axis, of an electric rotating machine apparatus 100 according to Embodiment 1. FIG. 4 represents the connection between the control circuit board 14 and the electromagnetic shield 37. The grounding bus bar 38 is formed in an L-shaped manner; the horizontal surface thereof abuts on the inside of the top surface of the electromagnetic shield 37 so as to be electrically connected therewith. The vertical surface thereof abuts on a grounding strip conductor 142 of the control circuit board 14 so as to be electrically connected therewith.

A hexagonal nut 39 is disposed beneath the portion, of the grounding bus bar 38, that makes contact with the electromagnetic shield 37 and is supported by a resin bus-bar holder 61. A screw 60a is screwed from the upper side of the top surface of the electromagnetic shield 37, so that the grounding bus bar 38 and the lower side of the top surface of the electromagnetic shield 37 are adhered to and electrically connected with each other. The bus-bar holder 61 disposed beneath the grounding bus bar 38 holds the hexagonal nut 39 so as to apply rotation locking thereto. The bus-bar holder 61 holding the hexagonal nut 39 is assembled into the grounding bus bar 38 through press-fitting or the like.

From the top surface, the electromagnetic shield 37, the grounding bus bar 38, and the hexagonal nut 39 are assembled in that order; then, from the topmost position, the screw 60a is fastened. Assembling in the foregoing manner prevents any obstructive structure from protruding to the space above the screw 60a when the electromagnetic shield 37 and the grounding bus bar 38 are electrically connected with each other. Because it is not required to secure the distance between the electromagnetic shield 37 of the control unit 1 and the housing 40, this configuration contributes to downsizing of the control unit 1 in the axial direction.

The vertical surface of the grounding bus bar 38 is electrically connected with the grounding strip conductor 142 of the control circuit board 14. The grounding strip conductor 142 is included in the filter unit 17, along with the X capacitor 17b, and the Y capacitors 17c and 17d arranged on the control circuit board. A screw 60b fastens the surface, facing the control circuit board 14, of the grounding bus bar 38 from the outer circumferential side. The screw 60b fixes the vertical portion of the bus-bar holder 61, the vertical portion of the grounding bus bar 38, and the control circuit board 14 to a screw-fastening foundation 343 of the heat sink 34. Due to the fastening by the screw 60b, the grounding bus bar 38 and the grounding strip conductor 142 of the filter unit 17 are electrically connected with each other. Because the grounding strip conductor 142 is included in the filter unit 17, high-reliability and low-cost connection can be performed.

The screw 60b is electrically connected with the heat sink 34 through screw fastening. However, because each of the bus-bar holder 61 and the heat sink 34 side of the control circuit board 14 is insulated, neither the electromagnetic shield 37 nor the grounding strip conductor 142 of the control circuit board 14 is electrically connected with the screw 60b and the heat sink 34. Because the X capacitor 17b and the Y capacitors 17b and 17c of the filter circuit are arranged on the top portion of the control circuit board 14, it is not required to provide a board dedicated to the filter circuit or a circuit-supporting structure dedicated to the filter circuit. Accordingly, the control unit can be configured compactly and inexpensively. Moreover, because the X capacitor and the Y capacitors are grounded not through the heat sink 34 close to the power module and the paths thereof, which are noise sources, but through the electromagnetic shield 37, noise can be suppressed.

There is adopted a structure in which fastening is performed by the screw 60b from the outer circumferential side of the center axis of the electric rotating machine 2; the vertical surface of the grounding bus bar 38 is disposed at the outer circumferential side of the control circuit board 14. As a result, the constituent portion for connecting the electromagnetic shield 37 with the grounding bus bar 38 is prevented from protruding to the upper surface of the heat sink 34 and wasting the space; thus, this method can contribute to downsizing of the control unit 1.

<Electromagnetic Shield>

Figure 5:
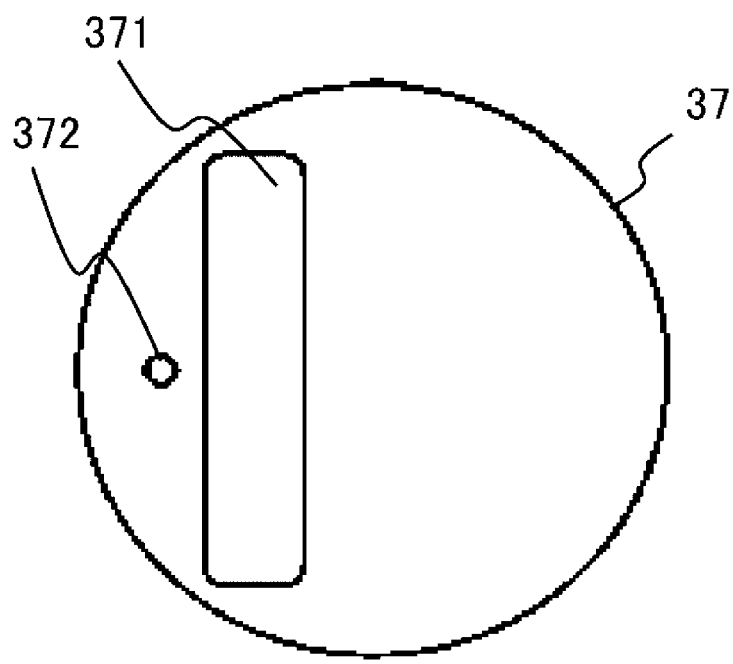
FIG. 5 is a top view of an electromagnetic shield in the electric rotating machine apparatus according to Embodiment 1.

FIG. 5 is a top view of the electromagnetic shield 37 in the electric rotating machine apparatus 100 according to Embodiment 1. In the top surface of the electromagnetic shield 37, there are provided the through hole 371 for making the control circuit board 14 protrude and a screw insertion hole 372 for making the screw 60b pass therethrough. Although not illustrated, a hole for positioning at a time of assembly may be provided. Moreover, it may be allowed that the through hole 371 is enlarged so that part of the top portion of the heat sink 34 or the bus bar unit 36 protrudes from the electromagnetic shield 37.

<Explanation for Comparative Example>

Figure 6:
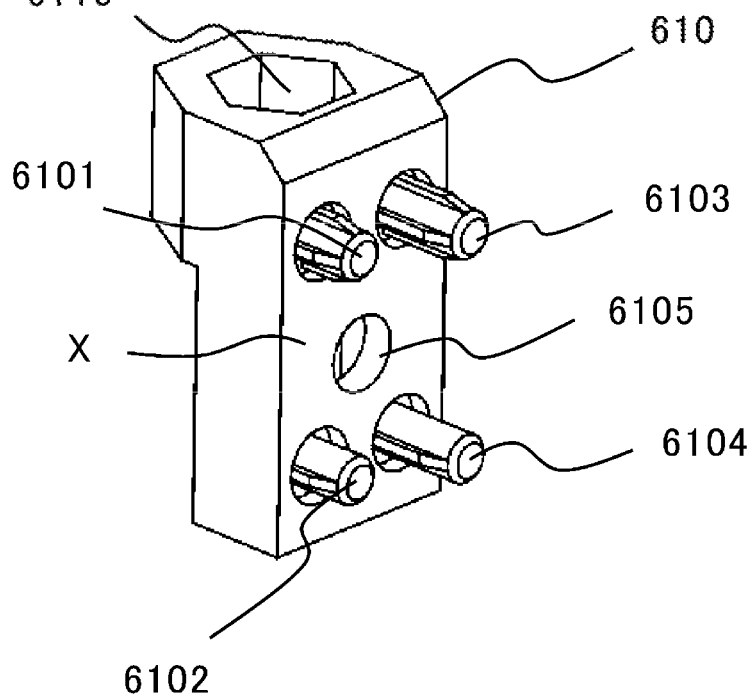
FIG. 6 is a perspective view of a bus-bar holder according to Comparative Example.

Next, there will be explained the case where a grounding bus bar 380 and a control circuit board 140 are assembled into the bus-bar holder 610 through a method according to Comparative Example. FIG. 6 is a perspective view of the bus-bar holder 610 according to Comparative Example. FIG. 6 is the perspective view of the bus-bar holder 610, when viewed in a direction in which an abutting surface X thereof that abuts on the grounding bus bar 380 is seen.

In the bus-bar holder 610, there are provided a first holder protruding portion 6101, a second holder protruding portion 6102, a third holder protruding portion 6103, and a fourth holder protruding portion 6104, and a holder through hole 6105 for screw fastening, and a hexagonal nut containing portion 6110.

Figure 7:
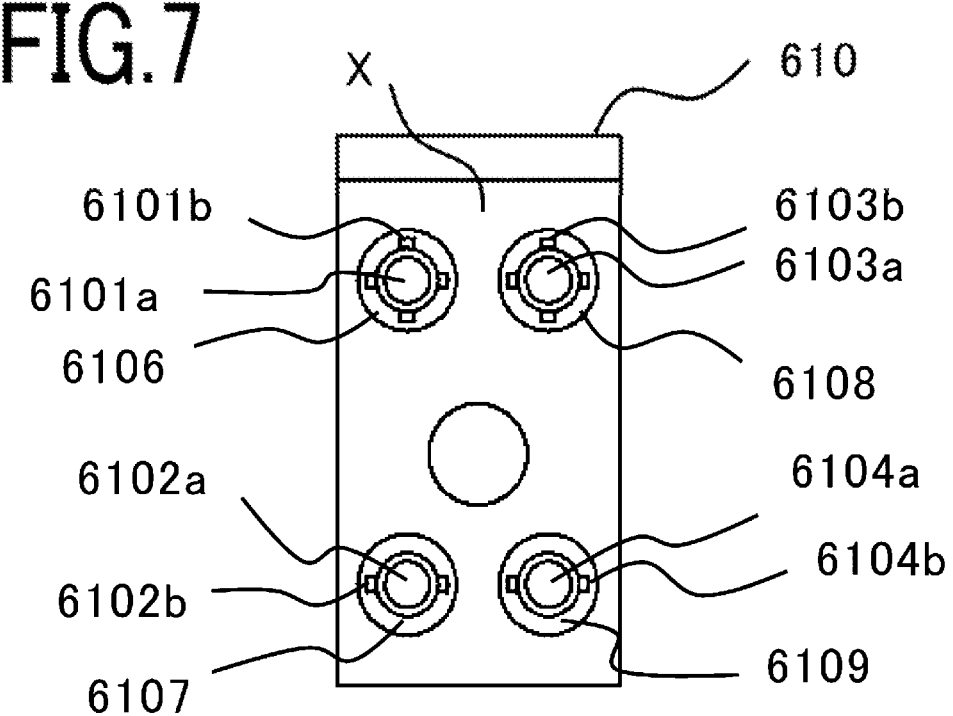
FIG. 7 is a front view of the bus-bar holder according to Comparative Example.

FIG. 7 is the abutting surface X of the bus-bar holder 610 according to Comparative Example, when viewed from the front side. The first holder protruding portion 6101 and the second holder protruding portion 6102 are utilized for assembling the bus-bar holder 610 with the grounding bus bar 380. The first holder protruding portion 6101 and the second holder protruding portion 6102 have a first holder columnar portion 6101a and a second holder columnar portion 6102a, respectively; the lengths thereof are identical to each other. The length of the columnar portion signifies the overall length of the columnar portion that extends from the base thereof toward the front end thereof.

In addition, the first holder protruding portion 6101 and the second holder protruding portion 6102 have respective two or more ribs each having the same length and the same outer diameter, provided on the respective outer circumferential surfaces of the first holder columnar portion 6101a and the second holder columnar portion 6102a. The length of the rib signifies the overall length of the rib that extends from the base of the columnar portion toward the front end thereof. The first holder protruding portion 6101 has four first holder ribs 6101b provided spaced evenly apart from one another. The second holder protruding portion 6102 has two second holder ribs 6102b in the horizontal direction.

The third holder protruding portion 6103 and the fourth holder protruding portion 6104 are utilized for assembling the bus-bar holder 610 with the control circuit board 140. The third holder protruding portion 6103 and the fourth holder protruding portion 6104 have a third holder columnar portion 6103a and a fourth holder columnar portion 6104a, respectively; the lengths thereof are identical to each other. The third holder protruding portion 6103 and the fourth holder protruding portion 6104 have respective two or more ribs each having the same length and the same outer diameter, provided on the respective outer circumferential surfaces of the third holder columnar portion 6103a and the fourth holder columnar portion 6104a. The third holder protruding portion 6103 has four third holder ribs 6103b provided spaced evenly apart from one another in the horizontal and vertical directions. The fourth holder protruding portion 6104 has two fourth holder ribs 6104b in the horizontal direction.

The columnar portion and the rib of each of the third holder protruding portion 6103 and the fourth holder protruding portion 6104 have respective lengths larger than respective lengths of the columnar portion and the rib of each of the first holder protruding portion 6101 and the second holder protruding portion 6102. A first holder concave portion 6106, a second holder concave portion 6107, a third holder concave portion 6108, and a fourth holder concave portion 6109 are provided in the respective peripheries, on the abutting surface X that abuts on the grounding bus bar, of the first through fourth protruding portions. In this example, it is assumed that the respective outer diameters of the columnar portions of the first through fourth protruding portions are identical to one another, that the respective outer diameters of the ribs of the first through fourth protruding portions are identical to one another, and that the respective outer diameters of the concave portions of the first through fourth protruding portions are identical to one another; however, it is only necessary that those respective outer diameters are appropriate for press-fitting into the corresponding through holes of the grounding bus bar; if such is the case, it may be allowed that those respective outer diameters are either identical to one another or different from one another.

Figure 8:
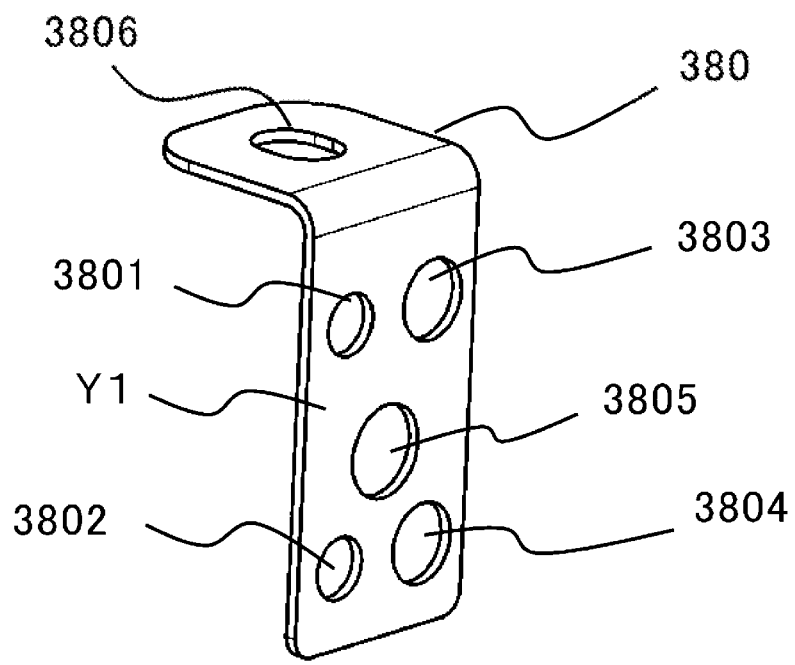
FIG. 8 is a perspective view of a bus bar according to Comparative Example.

FIG. 8 is a perspective view of the grounding bus bar 380 according to Comparative Example. FIG. 8 is the perspective view of the grounding bus bar 380, when viewed in a direction in which an abutting surface Y1 thereof that abuts on the control circuit board 140 is seen. The grounding bus bar 380 is L-shaped. In the abutting surface Y1, of the grounding bus bar 380, that abuts on the control circuit board 140, there are provided a first bus-bar through hole 3801 into which the first holder protruding portion 6101 of the bus-bar holder 610 is inserted, a second bus-bar through hole 3802 into which the second holder protruding portion 6102 is inserted, a third bus-bar through hole 3803 into which the third holder protruding portion 6103 is inserted, a fourth bus-bar through hole 3804 into which the fourth holder protruding portion 6104 is inserted, and a fifth bus-bar through hole 3805 into which a screw is inserted. In the surface, of the grounding bus bar 380, that abuts on the electromagnetic shield 37, there is provided a sixth bus-bar through hole 3806 into which the screw 60a is inserted and is screwed into the hexagonal nut 39.

The first bus-bar through hole 3801 has a diameter suitable for press-fitting the first holder ribs 6101b of the first holder protruding portion 6101 thereinto; the second bus-bar through hole 3802 has a diameter suitable for press-fitting the second holder ribs 6102b of the second holder protruding portion 6102 thereinto. The third bus-bar through hole 3803 has a diameter larger than the outer diameter of the third holder ribs 6103b so as not to make contact with the third holder rib 6103b of the third holder protruding portion 6103; the fourth bus-bar through hole 3804 has a diameter larger than the outer diameter of the fourth holder ribs 6104b so as not to make contact with the fourth holder rib 6104b of the fourth holder protruding portion 6104. In addition, the diameter of the fifth bus-bar through hole 3805 is set to be larger than that of the holder through hole 6105 for screw fastening, in order to avoid conduction with the screw 60b.

Figure 9:
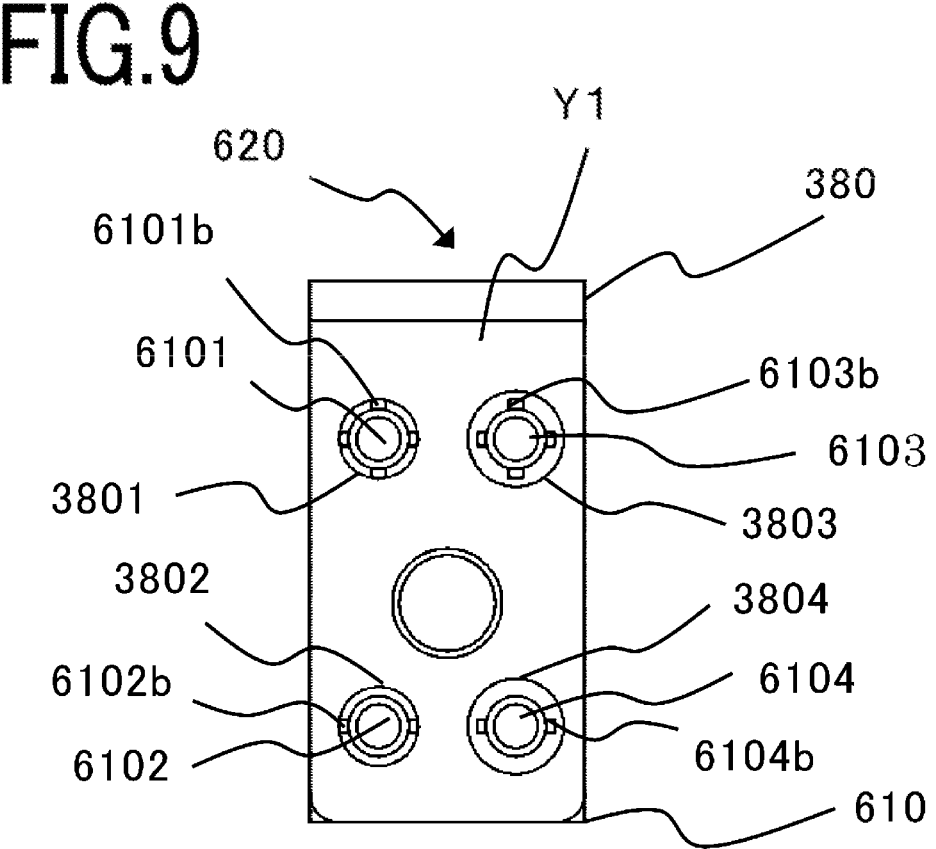
FIG. 9 is a front view of a bus bar unit according to Comparative Example.
Figure 10:
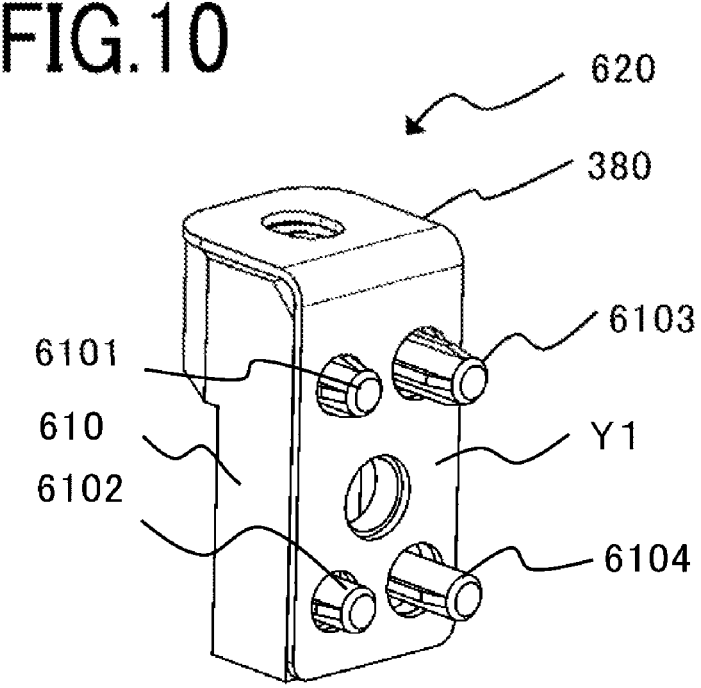
FIG. 10 is a perspective view of the bus bar unit according to Comparative Example.

FIG. 9 is a front view of the abutting surface Y1 of a bus bar unit 620 according to Comparative Example, when viewed from the front side. The bus bar unit 620 is an assembly product obtained by assembling the grounding bus bar 380 to the bus-bar holder 610. FIG. 10 is a perspective view of the bus bar unit 620, when viewed in a direction in which the abutting surface Y1 thereof that abuts on the control circuit board 140 is seen. Scrapings of the first holder rib 6101b, produced when the first holder protruding portion 6101 is press-fitted into the first bus-bar through hole 3801, are contained in the first holder concave portion 6106 provided around the root of the first holder protruding portion 6101. The configuration of the second holder protruding portion 6102 is the same as that of the first holder protruding portion 6101; scrapings of the second holder rib 6102b are contained in the second holder concave portion 6107 provided around the root of the second holder protruding portion 6102. The third bus-bar through hole 3803 has an outer diameter larger than that of the third holder ribs 6103b so as not to make contact with the third holder rib 6103b; the fourth bus-bar through hole 3804 has an outer diameter larger than that of the fourth holder ribs 6104b so as not to make contact with the fourth holder rib 6104b.

Figure 11:
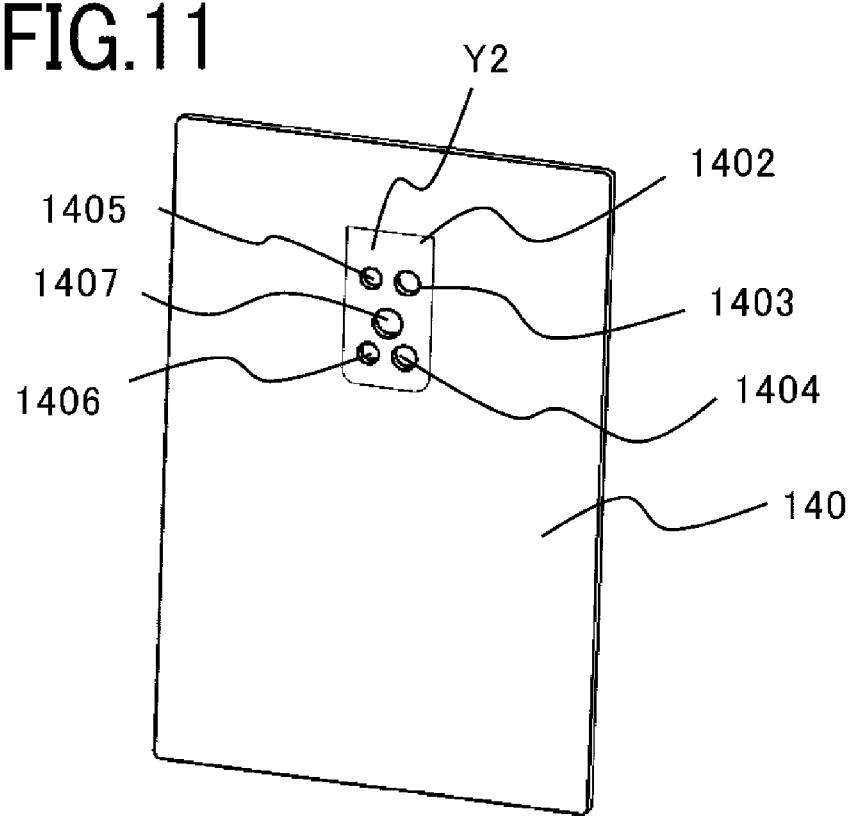
FIG. 11 is a first perspective view of a control circuit board according to Comparative Example.

FIG. 11 is a perspective view of the control circuit board 140, when viewed in a direction in which an abutting surface Y2 thereof that abuts on the grounding bus bar 380 is seen. In the control circuit board 140, there are provided a grounding strip conductor 1402 formed of copper foil, a first circuit board through hole 1403 of the control circuit board 140, corresponding to the first holder protruding portion 6101, a second circuit board through hole 1404 of the control circuit board 140, corresponding to the second holder protruding portion 6102, a third circuit board through hole 1405 of the control circuit board 140, corresponding to the third holder protruding portion 6103, a fourth circuit board through hole 1406 of the control circuit board 140, corresponding to the fourth holder protruding portion 6104, and a screw-insertion fifth circuit board through hole 1407 of the control circuit board 140.

Figure 12:
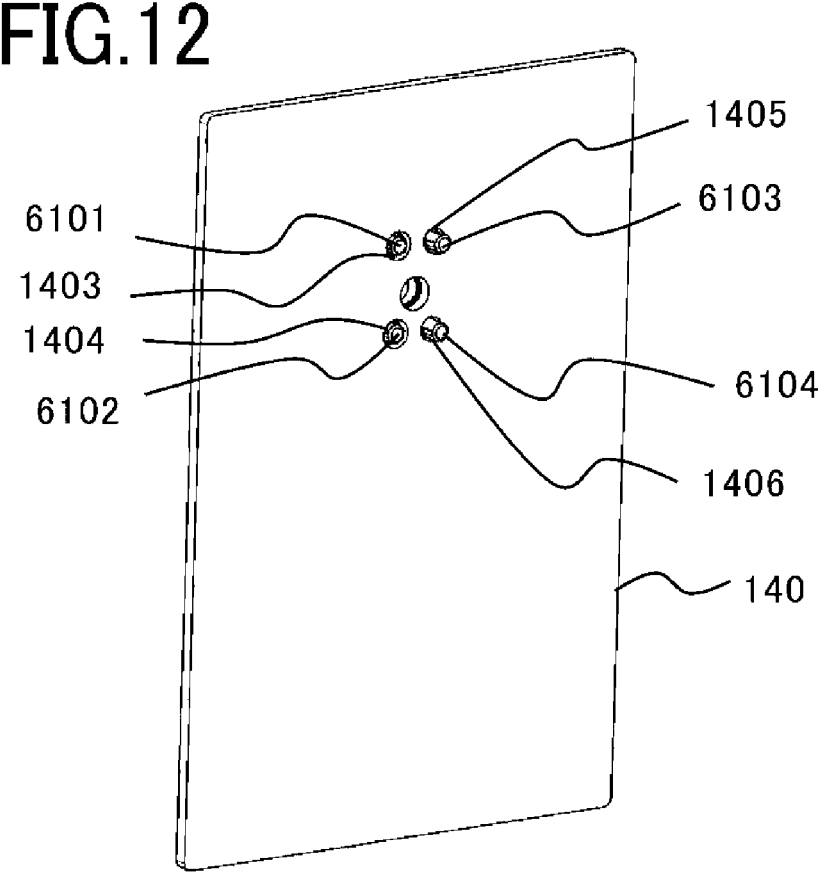
FIG. 12 is a second perspective view of the control circuit board according to Comparative Example.

FIG. 12 is a second perspective view of the control circuit board 140 assembled to the bus bar unit 620, when viewed from a heat sink 340 side (the heat sink 340 is unillustrated). The first circuit board through hole 1403 of the control circuit board 140 has an inner diameter larger than the outer diameter of the first holder ribs 6101b of the first holder protruding portion 6101; the second circuit board through hole 1404 of the control circuit board 140 has an inner diameter larger than the outer diameter of the second holder ribs 6102b of the second holder protruding portion 6102. As a result, the first circuit board through hole 1403 and the second circuit board through hole 1404 do not make contact with the first holder rib 6101b and the second holder rib 6102b, respectively. The third holder protruding portion 6103 and the fourth holder protruding portion 6104 are press-fitted into the third circuit board through hole 1405 and the fourth circuit board through hole 1406, respectively, of the control circuit board 140. The respective front ends of the first holder protruding portion 6101 through the fourth holder protruding portion 6104 protrude to the heat sink 340 side of the control circuit board 140. Although not illustrated here, at the respective receipt portions of the heat sink 340, there are provided avoiding holes for avoiding protruding portions, because it is required to avoid the first holder protruding portion 6101 through the fourth holder protruding portion 6104 that protrude from the control circuit board 140 to the heat sink 340 side.

As described above, the method according to Comparative Example requires that when the control circuit board 140 is assembled to the bus-bar holder 610 holding the bus bar unit 620, there are respectively provided the first holder protruding portion 6101 and the second holder protruding portion 6102 for assembling the grounding bus bar 380 and the third holder protruding portion 6103 and the fourth holder protruding portion 6104 for assembling the control circuit board 140. Accordingly, it is required that respective through holes or avoiding holes are provided in the grounding bus bar 380, the control circuit board 140, and the heat sink 340. Accordingly, the additional installation of the protruding portions upsizes the bus-bar holder 610. In addition, the additional installation of the through holes in the control circuit board 140 reduces the area where the connection lines and the components of the control circuit board can be arranged; thus, it is required to enlarge the control circuit board. Moreover, because it is required to additionally provide the avoiding holes in the heat sink 340, the degree of flexibility in the shape of the heat sink 340 is deteriorated. As a result, upsizing of and a cost increase in the electric rotating machine apparatus 100 is caused, and eventually, upsizing of and a cost increase in the electric power steering apparatus 150 equipped with the electric rotating machine apparatus 100 is caused.

<Bus Bar Unit According to Embodiment 1>

Figure 13:
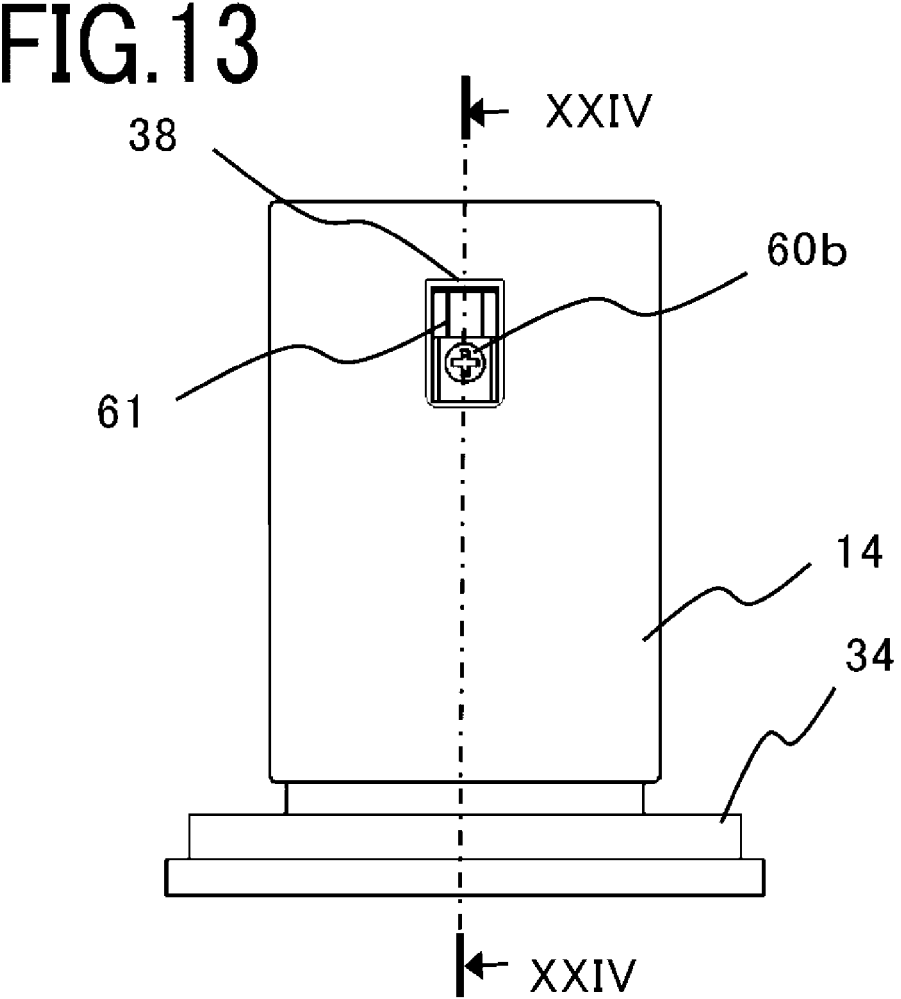
FIG. 13 is a front view of the electric rotating machine apparatus according to Embodiment 1.

There will be explained assembly of the grounding bus bar 38 and the control circuit board 14 to the bus-bar holder 61 according to Embodiment 1. FIG. 13 is a front view of the electric rotating machine apparatus 100 according to Embodiment 1. FIG. 13 is a front view of the control circuit board 14 at a time when the housing 40 of the control unit and the electromagnetic shield 37 are removed. In this description, the components unnecessary for the explanation will not be illustrated. The grounding bus bar 38 and the bus-bar holder 61 for connecting the control circuit board 14 with the electromagnetic shield 37 are arranged close to the center line of the control circuit board 14 and are fixed to the heat sink 34 by the screw 60b.

Figure 14:
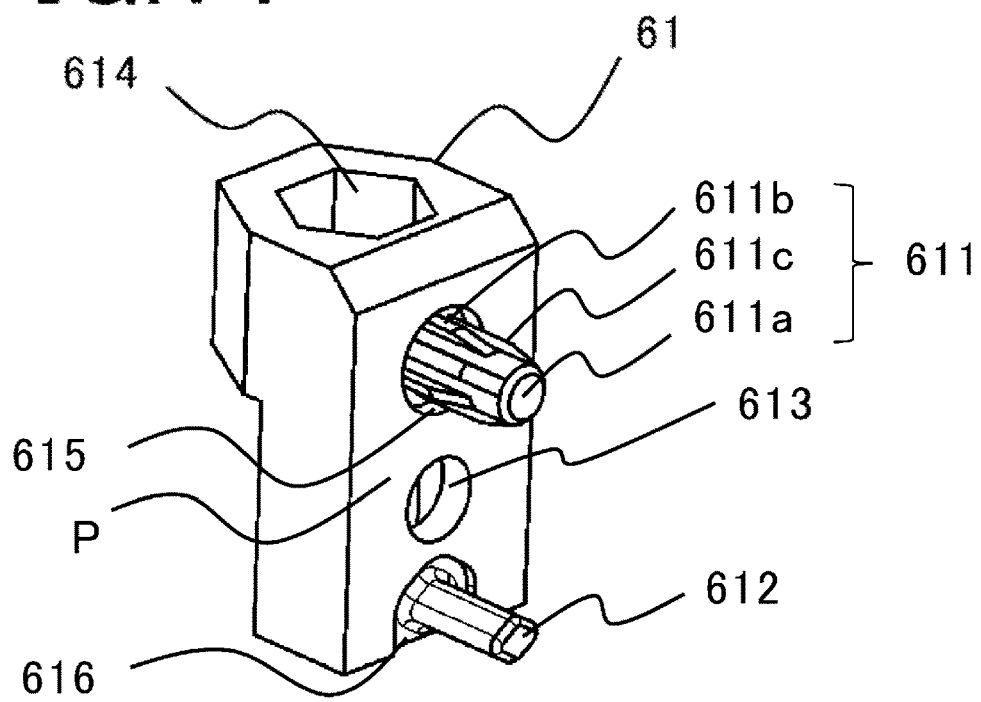
FIG. 14 is a perspective view of a bus-bar holder according to Embodiment 1.
Figure 15:
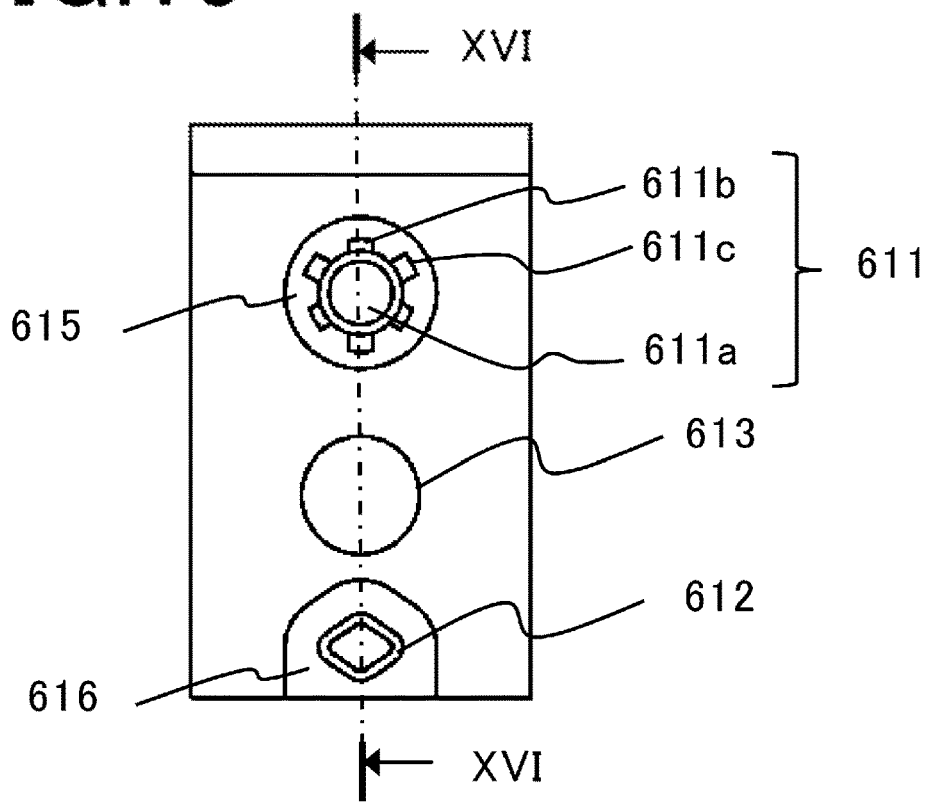
FIG. 15 is a front view of the bus-bar holder according to Embodiment 1.
Figure 16:
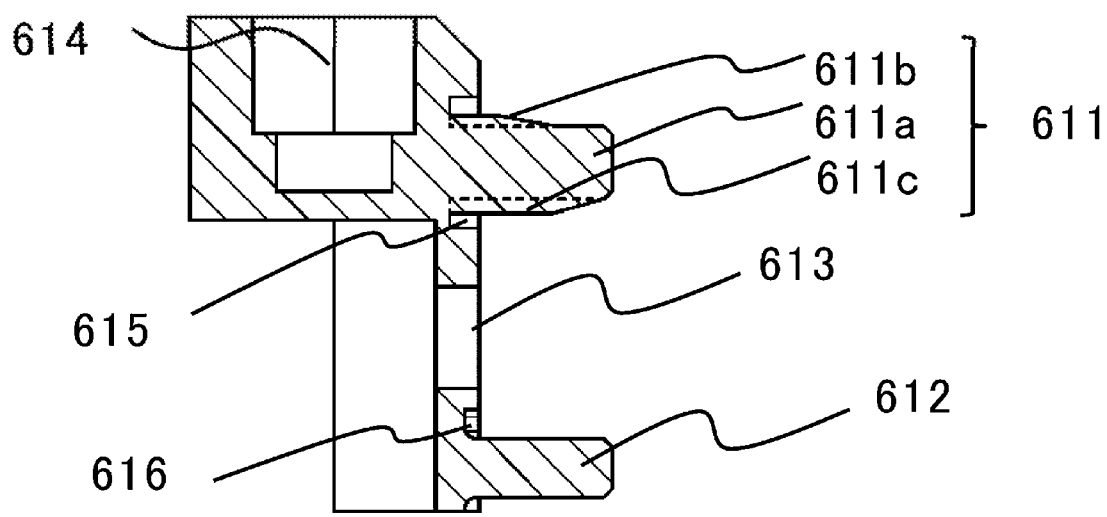
FIG. 16 is a cross-sectional view of the bus-bar holder according to Embodiment 1.

FIG. 14 is a perspective view of the bus-bar holder 61 according to Embodiment 1, when viewed in a direction in which an abutting surface P thereof that abuts on the grounding bus bar is seen. FIG. 15 is a front view of the bus-bar holder 61 at a time when the abutting surface P thereof faces the front. FIG. 16 is a cross-sectional view of the bus-bar holder 61 in FIG. 15, taken along the XVI cross section.

The bus-bar holder 61 is provided with a first protruding portion 611, a second protruding portion 612, a seventh through hole 613 for screw fastening, and a hexagonal nut containing portion 614. The first protruding portion 611 is provided with a columnar portion 611a and two or more ribs on the outer circumferential surface of the columnar portion 611a. The first protruding portion 611 is provided with three pieces each of a first rib 611c and a second rib 611b whose diameters are different from each other and whose lengths are different from each other. The length of the rib signifies the overall length of the rib that extends from the base of the columnar portion toward the front end thereof.

In the present embodiment, one type of the ribs, the diameter and length of which are larger than those of the other type thereof will be referred to as the first rib 611c; the other type will be referred to as the second rib 611b. The first rib 611c and the second rib 611b are utilized for press-fitting into the control circuit board 14 and the grounding bus bar 38, respectively.

A first concave portion 615 whose outside is enclosed in a circle is provided around the root of the first protruding portion 611 on the abutting surface P, of the bus-bar holder 61, that abuts on the grounding bus bar 38. The second protruding portion 612 is in the shape of a prism whose cross section is a horizontally extended rhombus. A second concave portion 616 enclosing the rhombus-shaped second protruding portion 612 is provided around the root of the second protruding portion 612 on the abutting surface P that abuts on the grounding bus bar 38.

Figure 17:
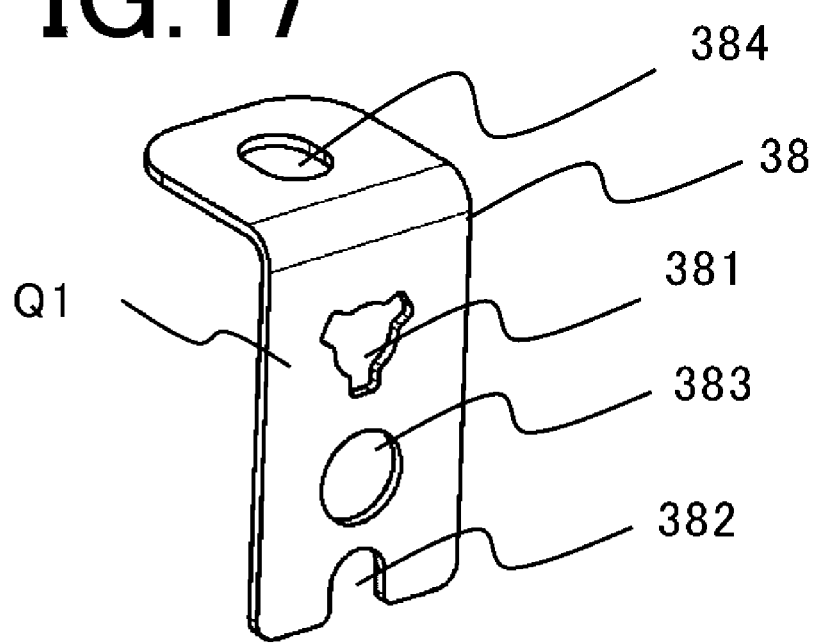
FIG. 17 is a perspective view of a bus bar according to Embodiment 1.
Figure 18:
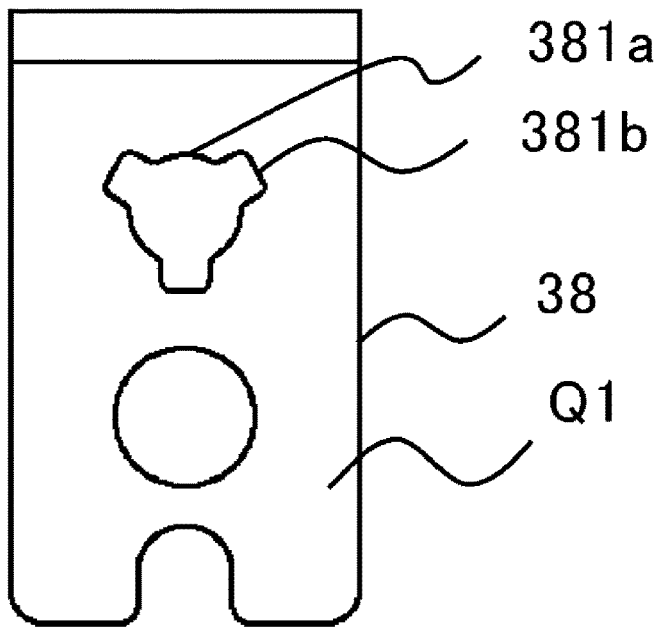
FIG. 18 is a front view of the bus bar according to Embodiment 1.

FIG. 17 is a perspective view of the grounding bus bar 38, when viewed in a direction in which an abutting surface Q1 thereof that abuts on the control circuit board 14 is seen. FIG. 18 is a front view of the grounding bus bar 38 utilized in Embodiment 1, when the abutting surface Q1 thereof faces the front side.

The grounding bus bar 38 is L-shaped; in the abutting surface Q1 thereof that abuts on the control circuit board, there are provided
   a second through hole 381 into which the first protruding portion 611 of the bus-bar holder 61 is inserted, a fourth through hole 382 into which the second protruding portion 612 is inserted, and a sixth through hole 383 into which a screw is inserted. In the surface, of the grounding bus bar 380, that abuts on the electromagnetic shield, there is provided an eighth through hole 384 into which the screw 60a is inserted and is screwed into the hexagonal nut 39.

The second through hole 381 has a circular portion 381a having a diameter corresponding to press-fitting of the second rib 611b of the first protruding portion 611 and two or more cut-out portions 381b provided for avoiding the first ribs 611c. Accordingly, it is made possible to perform press-fitting of the bus-bar holder 61 and the grounding bus bar 38, without providing any effect to the shape of the first rib 611c. The fourth through hole 382 is a cut-out hole. The cut-out hole saves the materials for the components and facilitates assembly of the grounding bus bar 38 to the bus-bar holder 61. In addition, the diameter of the sixth through hole 383 is set to be larger than that of the screw-fastening seventh through hole 613 in the bus-bar holder 61, in order to avoid conduction with the screw 60b. In addition, in Embodiment 1, the fourth through hole 382 of the bus bar is in the shape of a cut-out hole; however, the fourth through hole 382 may be in the shape of a circular hole. The machining of a circular-hole shape is easy, and in order to restrict the travel of the second protruding portion 612, it is desirable that the fourth through hole 382 is in the shape of not a cut-out hole but a through hole without a cutout.

Figure 19:
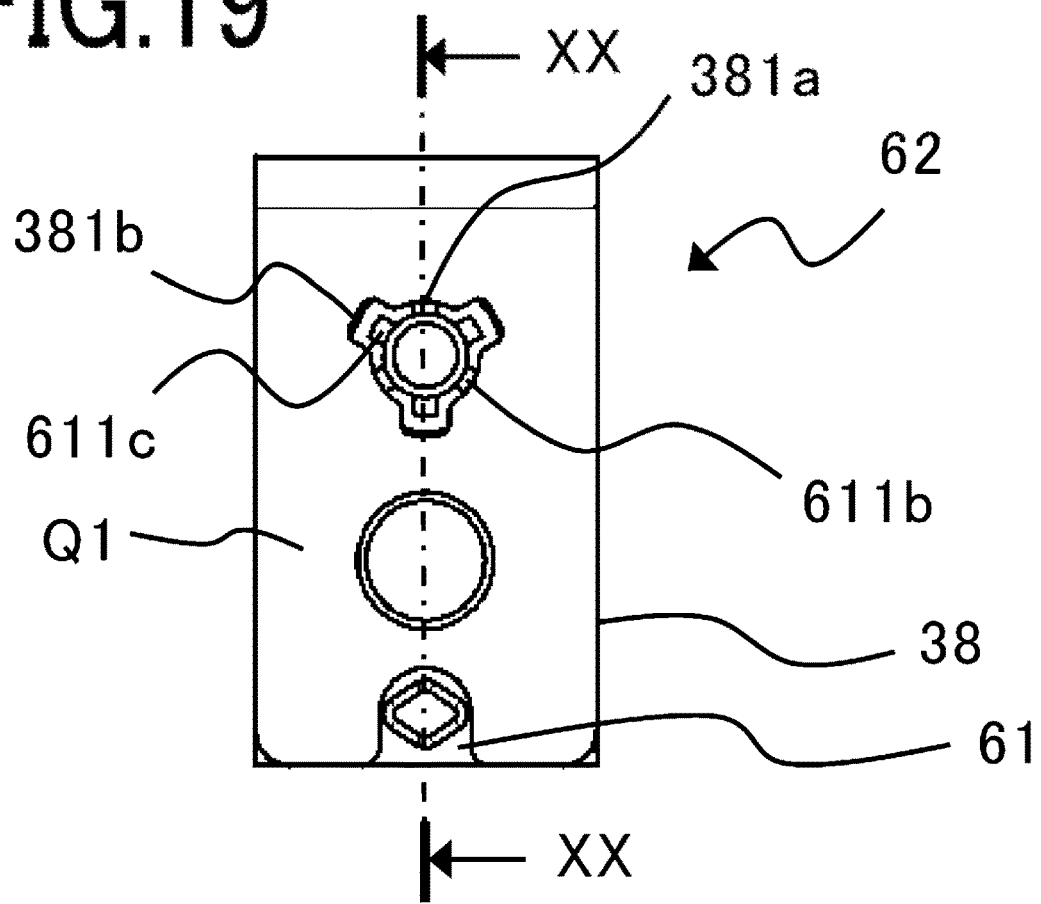
FIG. 19 is a front view of a bus bar unit according to Embodiment 1.
Figure 20:
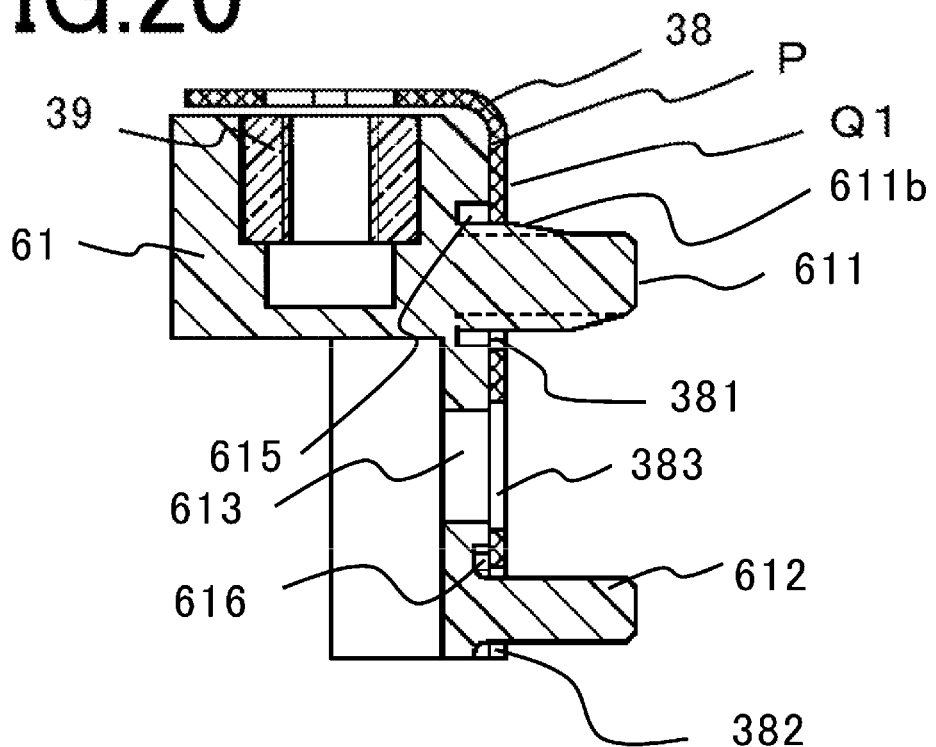
FIG. 20 is a cross-sectional view of the bus bar unit according to Embodiment 1.

FIG. 19 is a front view illustrating a bus bar unit 62 according to Embodiment 1, when the grounding bus bar 38 is assembled to the bus-bar holder 61. FIG. 19 is a view of the bus bar unit 62, when the bus-bar holder 61 and the abutting surface Q1, of the grounding bus bar 38, that abuts on the control circuit board 14 face the front. FIG. 20 is a cross-sectional view of the bus bar unit 62, taken along the XX cross section in FIG. 19. In some cases, when the first protruding portion 611 is press-fitted into the second through hole 381, scrapings of part of the second rib 611b that is elastically deformed remain on the abutting surface P of the bus-bar holder 61. When the scrapings adhere to the abutting surface P, of the bus-bar holder 61, that abuts on the grounding bus bar 38, the scrapings of the first rib 611c raise the grounding bus bar 38. In order to prevent the above phenomenon, there is provided the first concave portion 615 whose outer circumference is circular in shape. The scrapings of the rib are contained in the first concave portion 615, so that the grounding bus bar 38 can be suppressed from being raised. In addition, because the second protruding portion 612 is a resin mold, a rounded part is produced in the root portion thereof. In some cases, the grounding bus bar 38 collides with this rounded part and hence is raised from the abutting surface P. In order to prevent the phenomenon, the second concave portion 616 is provided around the root of the second protruding portion 612. Because the second protruding portion 612 is not press-fitted into the fourth through hole 382 of the grounding bus bar 38, part of the second concave portion 616 may not be enclosed by the inner wall included in the abutting surface P.

Figure 21:
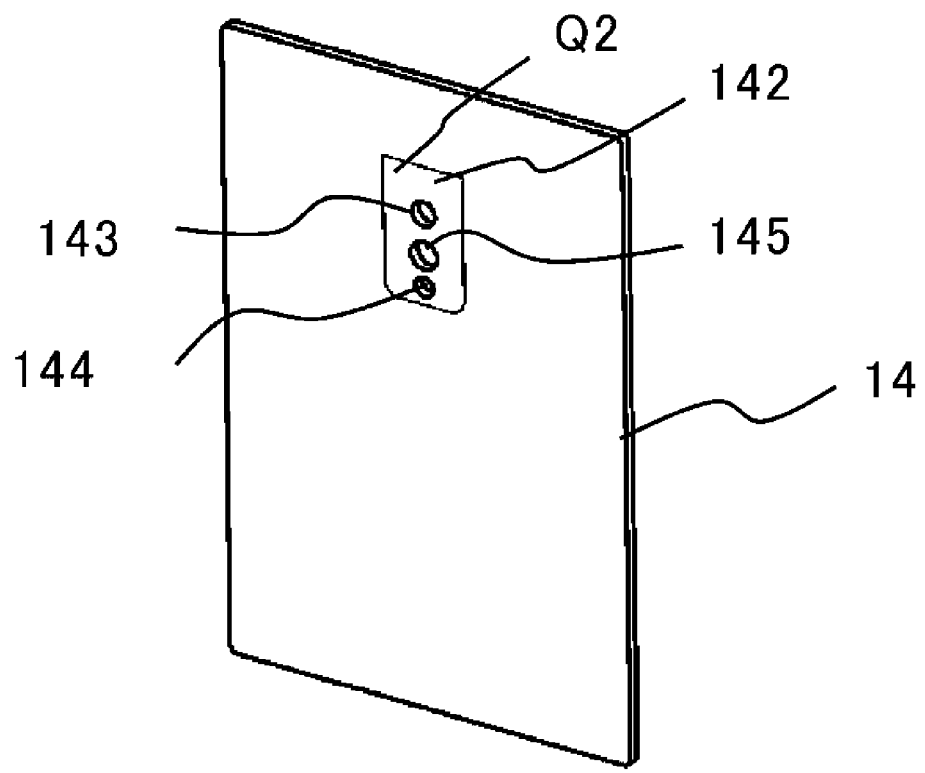
FIG. 21 is a perspective view of a control circuit board according to Embodiment 1.

FIG. 21 is a perspective view of the bus-bar holder 14 according to Embodiment 1, when viewed in a direction in which an abutting surface Q2 thereof that abuts on the grounding bus bar is seen. In the control circuit board 14, there are provided the grounding strip conductor 142 formed of copper foil, a first through hole 143 corresponding to the first protruding portion 611, a third through hole 144 corresponding to the second protruding portion 612, and a fifth through hole 145 into which the screw 60b is inserted.

Figure 22:
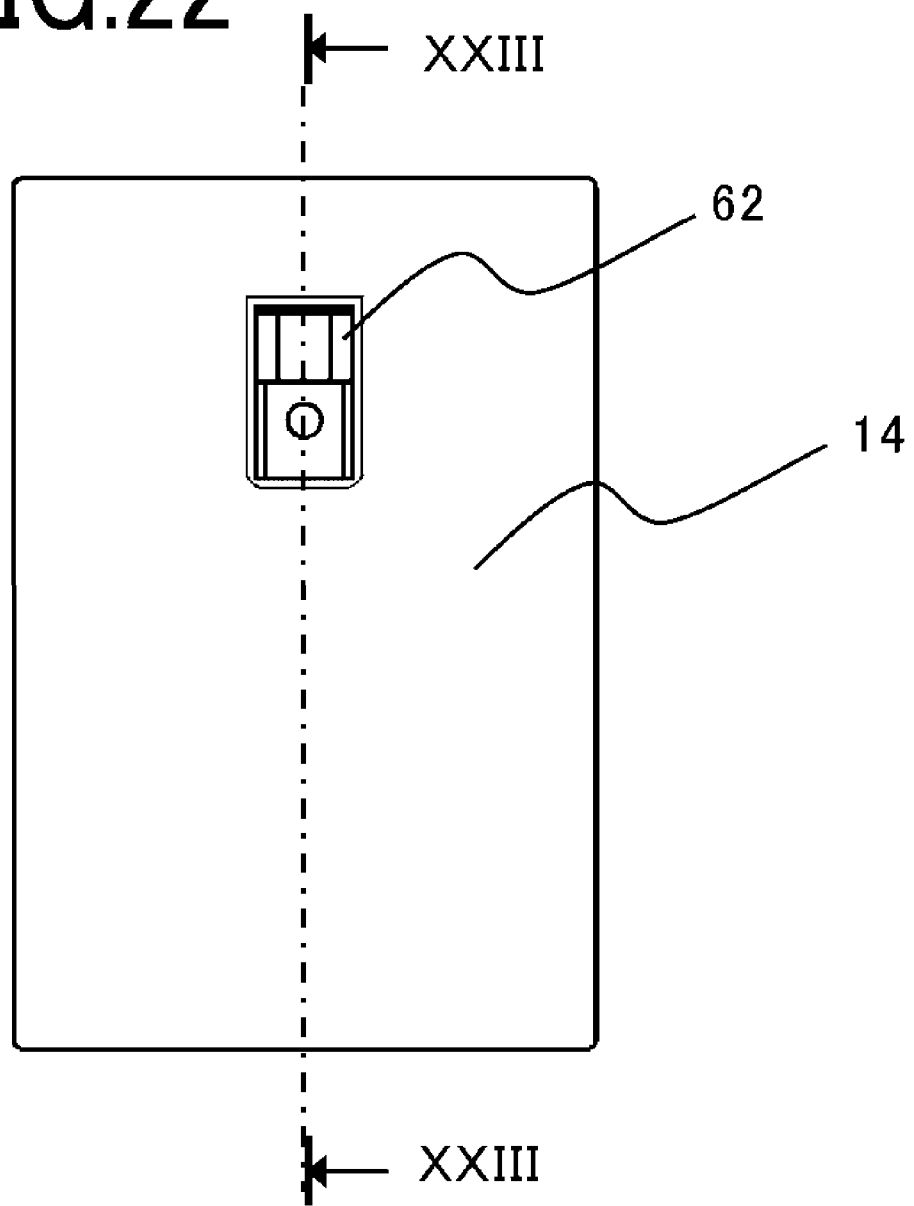
FIG. 22 is a front view of the control circuit board according to Embodiment 1.
Figure 23:
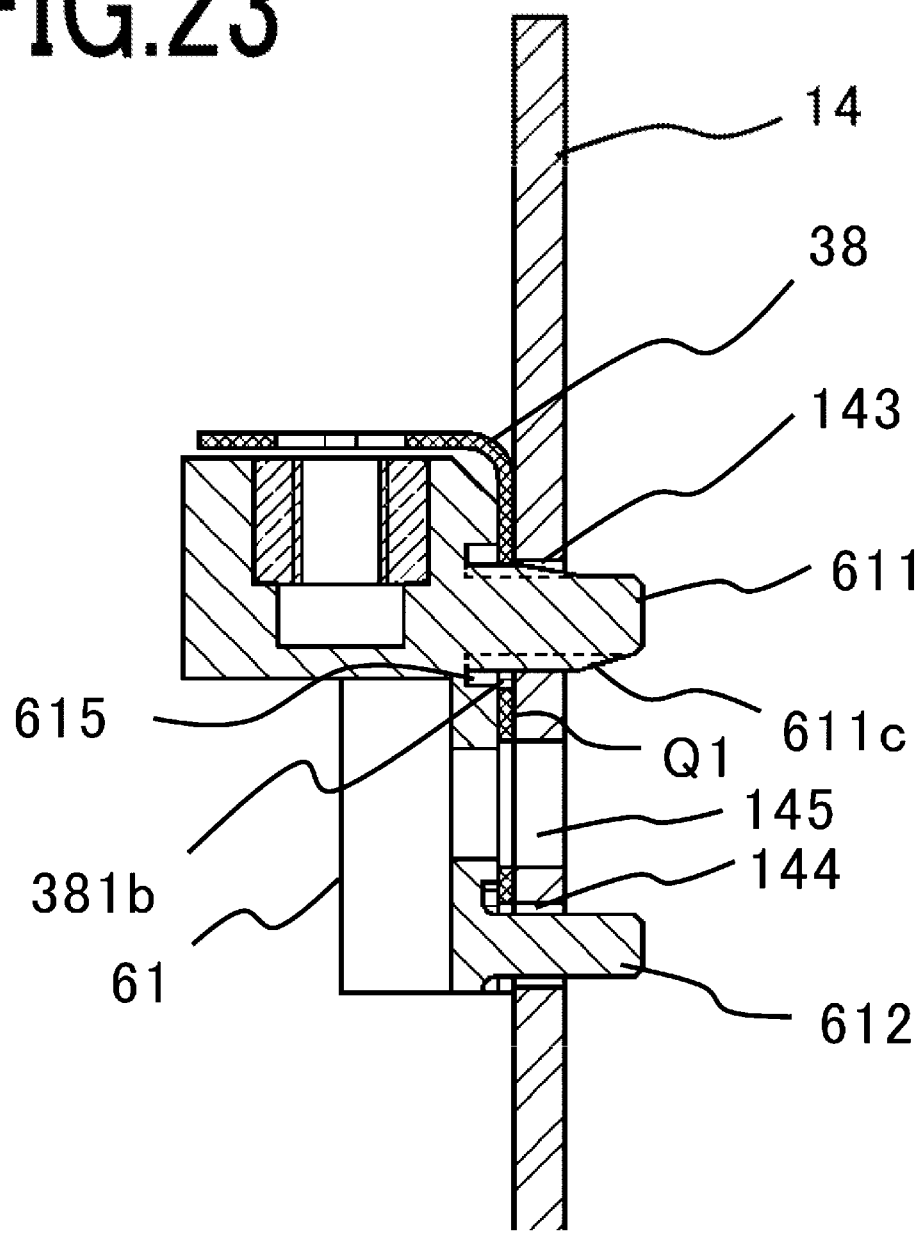
FIG. 23 is a cross-sectional view of the control circuit board according to Embodiment 1.

FIG. 22 is a front view of the control circuit board 14, when the control circuit board 14 is assembled to the bus bar unit 62 according to Embodiment 1. FIG. 23 is a cross-sectional view of the principal part and the periphery thereof, taken along the XXIII cross section in FIG. 22.

When press-fitted into the first through hole 143 of the control circuit board 14, the first rib 611c makes contact with the inner circumference portion of the first through hole 143. In some cases, when the first rib 611c is press-fitted into the first through hole 143, scrapings of part of the first rib 611c that is elastically deformed remain on the control circuit board 14 at the grounding bus bar 38 side. When the scrapings adhere to the abutting surface Q1 between the control circuit board 14 and the grounding bus bar 38, the scrapings of the first rib 611c raise the grounding bus bar 38 from the control circuit board 14. In that case, the conduction between the grounding strip conductor 142 of the control circuit board 14 and the grounding bus bar 38 is impeded. In order to prevent the phenomenon, the cut-out portion 381b provided in the second through hole 381 of the grounding bus bar 38 has a shape for avoiding the first rib 611c, and the scrapings are contained in the cut-out portion 381b and the first concave portion 615 of the bus-bar holder 61; thus, the grounding bus bar 38 can be prevented from being raised.

Figure 24:
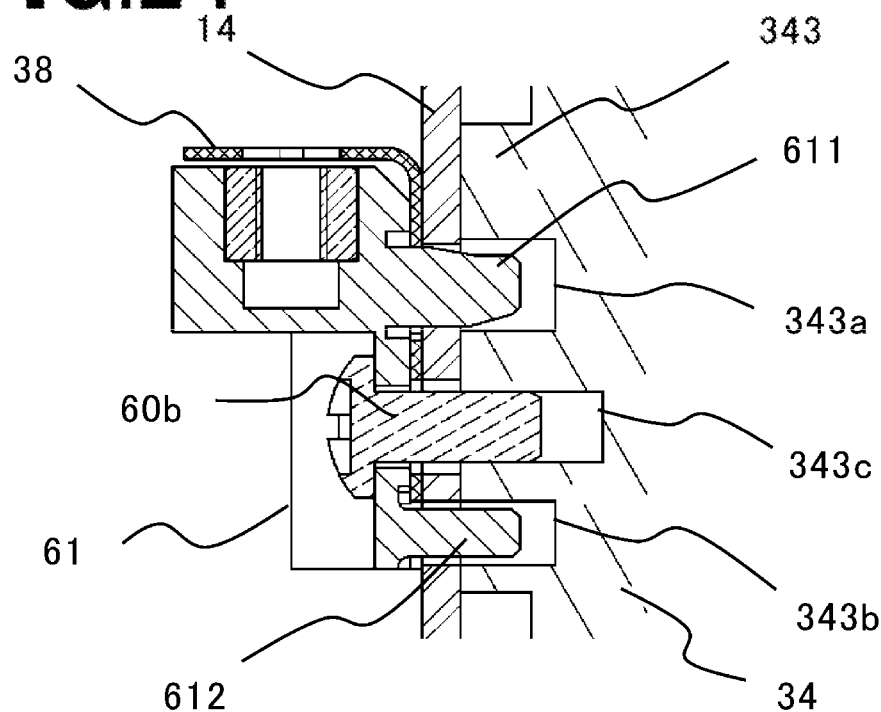
FIG. 24 is a cross-sectional view of principal parts in a control unit according to Embodiment 1.

FIG. 24 is a cross-sectional view of the principal part and the periphery thereof, taken along the XXIV cross section in FIG. 13. In a receipt portion 343 of the heat sink 34, there are provided an avoiding hole 343 for avoiding the first protruding portion 611, an avoiding hole 343b for avoiding the second protruding portion 612, and a screw fastening hole 343c. The first protruding portion 611 and the second protruding portion 612 are assembled to the avoiding hole 343a and the avoiding hole 343b, respectively, so as to be contained therein.

In Comparative Example illustrated in FIGS. 6 through 12, the bus-bar holder 610 requires the four protruding portions, i.e., the first holder protruding portion 6101, the second holder protruding portion 6102, the third holder protruding portion 6103, and the fourth holder protruding portion 6104. In contrast, in Embodiment 1, as illustrated in FIGS. 13 through 24, the grounding bus bar 38 and the control circuit board 14 can be fixed to each other by use of the two protruding portions, i.e., the first protruding portion 611 and the second protruding portion 612. Therefore, it may be allowed that the respective numbers of the through holes in the control circuit board 14 and the grounding bus bar 38 and the number of the avoiding holes in the heat sink 34 are only two. Accordingly, because the respective complexities, volumes, and assembling man-hours of the components can be reduced, downsizing and cost saving can be promoted.

The downsizing of each of the components results in weight saving. Moreover, the occupation area of the through holes on the control circuit board decreases; thus, this method can contribute to downsizing of the control circuit board and further to downsizing of the control unit. Therefore, it is made possible to promote downsizing of the electric rotating machine apparatus 100 described in Embodiment 1 and a power steering apparatus provided with the electric rotating machine apparatus 100; thus, this configuration can contribute to weight saving and cost reduction therefor.

There has been described the case where the bus-bar holder 61 according to Embodiment 1 illustrated in FIGS. 13 through 24 has two protruding portions, i.e., the first protruding portion 611 and the second protruding portion 612. However, it is made also possible that the grounding bus bar 38 and the control circuit board 14 are assembled to the bus-bar holder 61 by use of only the first protruding portion 611, omitting the second protruding portion 612. That method makes it possible to omit the second protruding portion 612, the third through hole 144 of the control circuit board, and the fourth through hole 382 of the grounding bus bar. As a result, it is made possible to further promote downsizing of the electric rotating machine apparatus 100 and a power steering apparatus provided with the electric rotating machine apparatus 100; thus, this configuration can contribute also to weight saving and cost reduction therefor.

There has been explained the example in which as illustrated in FIG. 14, the first protruding portion 611 is provided with three pieces each of the first rib 611c and the second rib 611b whose diameters are different from each other and whose lengths are different from each other. It is not required that each of the respective numbers of the first ribs 611c and the second ribs 611b is three; it is only necessary that each of the respective numbers is plural. This is because it is only necessary that the grounding bus bar 38 and the control circuit board 14 can be press-fitted into and fixed to the bus-bar holder 61.

It is desirable that more than three pieces each of the first rib 611c and the second rib 611b are provided. This is because when more than three pieces each of them are provided, fixation through press-fitting can more stably be performed and hence centering through press-fitting can securely be performed.

In addition, it is desirable that two or more ribs are provided spaced evenly apart from one another around the columnar portion 611a of the first protruding portion 611. This is because when the fixation through press-fitting can further stably be performed and hence the centering through press-fitting can more securely be performed.

It may be allowed that the length of the first rib 611c is set to be the same or larger than the sum of the thickness of the grounding bus bar 38 and the thickness of the control circuit board 14, that the length of the second rib 611b is set to be the same as or smaller than the thickness of the grounding bus bar 38, and the diameter of the second rib 611b is set to be larger than the diameter of the first rib 611c. In that case, the diameter of the first through hole 143 in the control circuit board 14 and the diameter of the first rib 611c are set in such a way that interference-fitting is established therebetween, and the diameter of the second through hole 381 of the grounding bus bar 38 and the diameter of the second rib 611b are set in such a way that interference-fitting is established therebetween. As a result, the grounding bus bar 38 and the control circuit board 14 can be press-fitted into the bus-bar holder 61, even without providing the cut-out portion 381b in the second through hole 381 of the grounding bus bar 38. Because it is not required to provide the cut-out portion 381b in the second through hole 381 of the grounding bus bar 38, this method can contribute to cost reduction.

In addition, there has been explained the example in which the respective diameters of the first rib 611c and the second rib 611b are different from each other; however, it may be allowed that the respective diameters thereof are identical to each other. In that case, the respective diameters of the second through hole 381 in the grounding bus bar 38, the diameter of the first rib 611c, and the second rib 611b are set in such a way that loose interference-fittings are established therebetween, and the respective diameters of the second through hole 381 in the grounding bus bar 38 and the diameter of the first through hole 143 of the control circuit board 14 are set in such a way that tight interference-fitting is established therebetween, so that the grounding bus bar 38 and the control circuit board 14 can be press-fitted into the bus-bar holder 61, even without providing the cut-out portion 381b in the second through hole 381 of the grounding bus bar 38. Because it is not required to provide the cut-out portion 381b in the second through hole 381 of the grounding bus bar 38, this method can contribute to cost reduction.

In Embodiment 1, there has been explained the case where the grounding bus bar 38 is fixed to the bus-bar holder 61. However, the application of a bus bar is not limited to the grounding application. The technology of fixation to the bus-bar holder 61, explained in Embodiment 1, can be applied also to the bus bars for other applications, such as a power-source bus bar and a bus bar for transferring an electric-rotating-machine driving current. In addition, in this situation, it may be allowed that the strip conductor, of the control circuit board 14, that is pressed against and conductively connected with the bus bar is not a wiring strip conductor for grounding but a power-source strip conductor at the high-voltage side, a strip conductor for an electric-rotating-machine driving current, or the like.

In Embodiment 1, there has been explained the case where the control circuit board 14 is fixed to the bus-bar holder 61. However, the board to be fixed to the bus-bar holder 61 is not limited to the control circuit board 14. The technology of fixation to the bus-bar holder 61, explained in Embodiment 1, can be applied also to circuit boards other than a control circuit board, such as a circuit board utilized for electric-rotating-machine driving wiring and a circuit board for transferring a rotation sensor signal.

In Embodiment 1, there has been explained the case where the second protruding portion 612 is in the shape of a prism whose cross section is a horizontally extended rhombus in FIG. 15. In contrast to the first protruding portion 611 in which around the columnar portion 611a, two or more ribs are provided spaced evenly apart from one another, the second protruding portion 612 is rhombus-shaped; therefore, even in the case where the relative position among the bus-bar holder 61, the grounding bus bar 38, and the control circuit board 14 is mistakenly turned by 180°, press-fitting can be prevented by setting the dimensions in such a way that insertion is impossible. By making the cross section of the second protruding portion 612 rhombus-shaped and by contriving the respective shapes, such as a rhombus, which is a shape the same as that of the second protruding portion 612, and an ellipse, of the fourth through hole 382 of the grounding bus bar 38 and the third through hole 144 of the control circuit board 14, press-fitting can be prevented even in the case where the second protruding portion 612 is mistakenly turned by 90°.

In Embodiment 1, there has been explained the case where the second protruding portion 612 is provided. By providing the second protruding portion 612 in addition to the first protruding portion 611, there is provided a function of preventing the relative position among the bus-bar holder 61, the grounding bus bar 38, and the control circuit board 14 from rotating. Positioning is performed by means of the first protruding portion 611 and the second protruding portion 612 before final fixation is made by use of the screw 60b, so that the assembly efficiency is raised; thus, this configuration contributes to cost reduction. Moreover, it can also be prevented that after the grounding bus bar 38 and the control circuit board 14 are press-fitted into the bus-bar holder 61, relative rotation among the components causes the ribs to be scraped and hence press-fitting fixation power is deteriorated. In addition, it can be expected that the positioning by use of the first protruding portion 611 and the second protruding portion 612 raises the assembly accuracy of the product.

In Embodiment 1, there is describes the configuration in which the grounding bus bar 38 and the control circuit board 14 are assembled to the bus-bar holder 61 and then the screw 60a fixes them to the heat sink 34. By means of the first protruding portion 611 of the bus-bar holder 61, the grounding bus bar 38 and the control circuit board 14 are assembled through press-fitting; from the screw-fastening seventh through hole 613 of the bus-bar holder 61, the screw strongly fastens the components through the sixth through hole 383 of the grounding bus bar 38 and the fifth through hole 145 of the control circuit board 14. This configuration makes it possible to perform high-strength fixation of the components of the electric rotating machine apparatus 100 in a compact, simple, and accurate manner. While the heat sink 34 realizes efficient cooling of the control circuit board 14, the abutting surface Q2 where the grounding strip conductor 142 of the control circuit board 14 and the grounding bus bar 38 abut on each other secures electric conduction and junction with high-physical strength can be secured; thus, this configuration is significant.

In Embodiment 1, there has been explained the case where the second protruding portion 612 is provided. By providing the second protruding portion 612 in addition to the first protruding portion 611, there is provided a function of accurately determining the relative position among the bus-bar holder 61, the grounding bus bar 38, and the control circuit board 14. Moreover, the screw-fastening seventh through hole 613 is provided between the first protruding portion 611 and the second protruding portion 612; the sixth through hole 383 is provided between the second through hole 381 and the fourth through hole 382 of the grounding bus bar 38; the fifth through hole 145 is provided between the first through hole 143 and the third through hole 144 of the control circuit board 14. Then, from the screw-fastening seventh through hole 613, the screw 60b is fastened into the screw fastening hole 343c thorough the fourth through hole 382 and the fifth through hole 145. This configuration makes it possible that the bus-bar holder 61, the grounding bus bar 38, and the control circuit board 14, which are positioned by the first protruding portion 611 and the second protruding portion 612, are directly fixed to the heat sink 34. Because the screw can be fastened in the through hole between the first protruding portion 611 and the second protruding portion 612, it is prevented that stress caused by fastening the screw produces distortion and hence the relative position among the components is displaced, and it is made possible to fix the components at the accurate positions; thus, this configuration is significant.

In Embodiment 1, the electromagnetic shield 37 for enclosing the control unit 1 is provided; the control circuit board 14 and the grounding bus bar 38 assembled into the control unit 1 are fixed to each other by the bus-bar holder 61; the grounding bus bar 38 makes contact with the electromagnetic shield 37. The configuration like this makes it possible that the control circuit board 14 is compactly fixed to the grounding bus bar 38 by the bus-bar holder 61 and its contact with the grounding bus bar 38 is secured. Accordingly, because compact and efficient fixation can be performed, this configuration can contribute to the downsizing, weight saving, and cost reduction of the electric rotating machine apparatus 100. Moreover, this configuration can contribute to the downsizing, weight saving, and cost reduction of the electric power steering apparatus 150 utilizing the electric rotating machine apparatus 100.

In Embodiment 1, as illustrated in FIG. 4, the control circuit board 14 has the grounding strip conductor 142 on the abutting surface Q1 that makes contact with the grounding bus bar 38; the grounding strip conductor 142 is pressed against the grounding bus bar 38 so as to be electrically connected therewith. Then, the grounding bus bar 38 makes contact with the electromagnetic shield 37 so as to be electrically connected therewith. As a result, because the grounding strip conductor 142 of the control circuit board 14 and the electromagnetic shield 37 are electrically connected with each other, the small-size bus-bar holder 61 makes it possible that noise is shielded by the effective electromagnetic shield.

In Embodiment 1, as illustrated in FIG. 4, the grounding bus bar 38 is formed in an L-shaped manner; the horizontal surface thereof abuts on the inside of the ceiling portion of the electromagnetic shield 37 so as to be electrically connected therewith. The vertical surface thereof abuts on the grounding strip conductor 142 of the control circuit board 14 so as to be electrically connected therewith. This configuration makes it possible that when the electromagnetic shield 37 and the grounding bus bar 38 are electrically connected with each other, the electromagnetic shield 37 around the control unit 1 is efficiently and compactly provided; thus, this configuration contributes to axial-direction downsizing of the control unit 1.

In Embodiment 1, as illustrated in FIGS. 2 and 4, the protruding portion 141 of the control circuit board 14 protrudes to the outside of the electromagnetic shield through the through hole 371 in the upper portion of the electromagnetic shield. Because the external connection terminal is provided in the protruding portion 141 of the control circuit board 14, it is made possible to perform compact external connection, while noise is prevented from propagating to the outside and external noise is prevented from invading inside.

2. Embodiment 2

In Embodiment 1, the first protruding portion 611 and the second protruding portion 612 of the bus-bar holder 61 are arranged in a row along the rotation axle 21 of the electric rotating machine 2. Moreover, the seventh through hole 613 for screw fastening is provided between the first protruding portion 611 and the second protruding portion 612. In contrast, the bus-bar holder 61 described in Embodiment 2 is different from the bus-bar holder 61 according to Embodiment 1 in that the first protruding portion 611 and the second protruding portion 612 are arranged in a row along the rotation direction of the rotation axle 21 of the electric rotating machine 2. Moreover, the seventh through hole 613 for screw fastening is provided between the first protruding portion 611 and the second protruding portion 612; the seventh through hole 613, the first protruding portion 611, and the second protruding portion 612 are aligned along the rotation direction of the rotation axle 21. In the case where in Embodiment 2, there exists a component corresponding to that in Embodiment 1, the foregoing component is designated by the same reference character.

Figure 25:
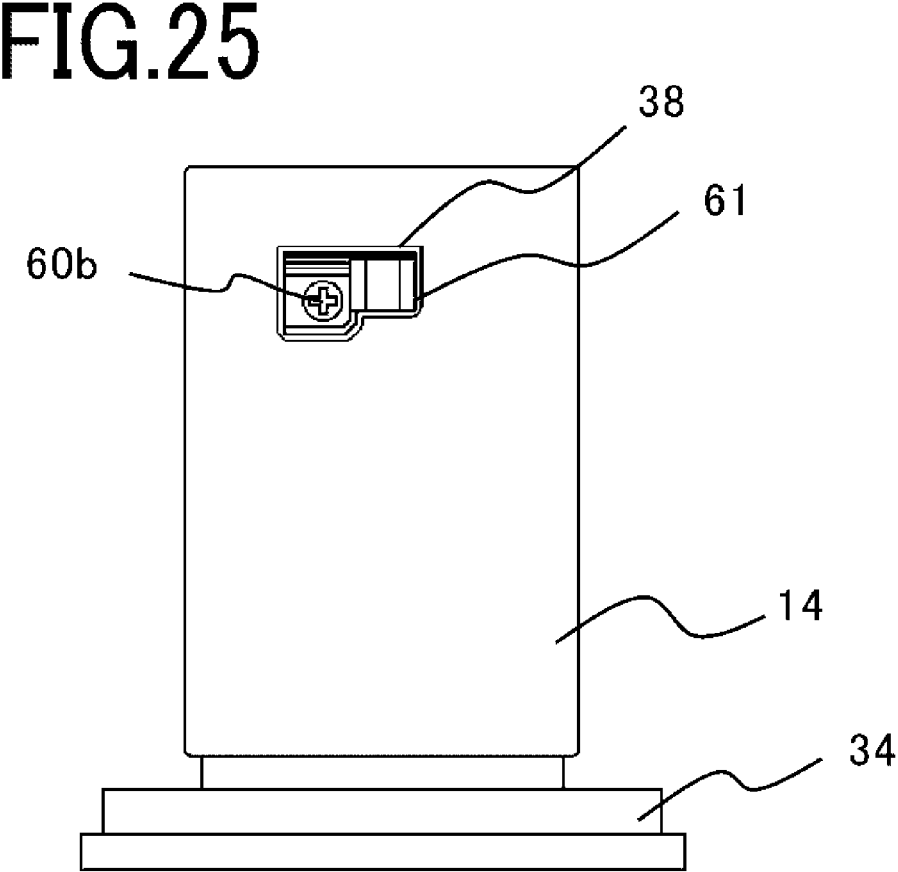
FIG. 25 is a front view of a control unit according to Embodiment 2.

FIG. 25 is a front view of the electric rotating machine apparatus 100 according to Embodiment 2. FIG. 25 is a front view of the control circuit board 14 at a time when the housing 40 of the control unit and the electromagnetic shield 37 are removed. In this description, the components unnecessary for the explanation will not be illustrated. The grounding bus bar 38 and the bus-bar holder 61 for connecting the control circuit board 14 with the electromagnetic shield 37 are arranged across the center line of the control circuit board 14 and are fixed to each other by the screw 60b.

In Embodiment 1, the screw-fastening seventh through hole 613 of the bus-bar holder 61 is disposed below the hexagonal nut containing portion 614; in contrast, in Embodiment 2, the screw-fastening seventh through hole 613 of the bus-bar holder 61 is disposed in the transverse direction of the hexagonal nut containing portion 614. When as described above, the respective positions of the screw-fastening seventh through hole 613 and the hexagonal nut containing portion 614 are arranged in a row in the rotation direction of the rotation axle 21 of the electric rotating machine 2, the dimension of the bus bar unit 62 in the axial direction of the rotation axle 21 of the electric rotating machine 2 can be reduced. Accordingly, the degree of flexibility in designing the electric rotating machine apparatus 100 increases and hence collision with other components can readily be avoided. As a result, this configuration can contribute to downsizing and cost reduction of the electric rotating machine apparatus 100.

Figure 26:
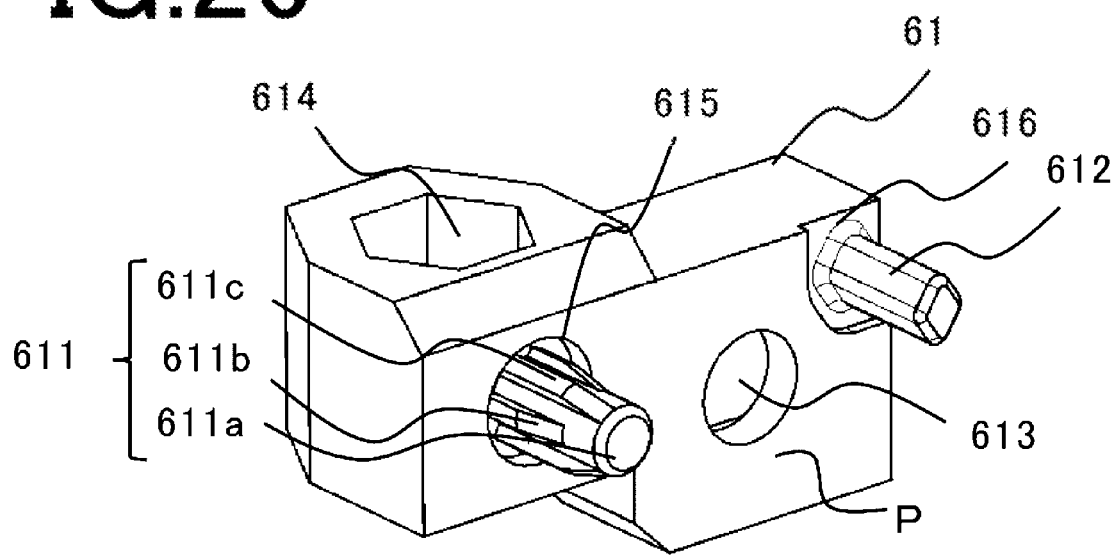
FIG. 26 is a perspective view of a bus-bar holder according to Embodiment 2.
Figure 27:
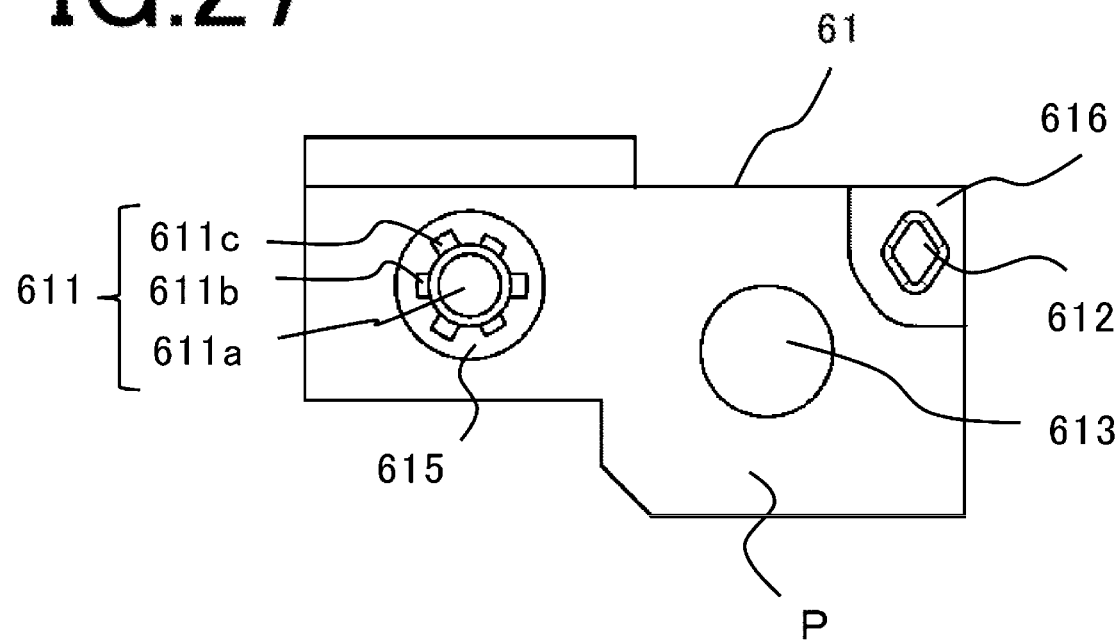
FIG. 27 is a front view of the bus-bar holder according to Embodiment 2.

FIG. 26 is a perspective view of the bus-bar holder 61 according to Embodiment 2, when viewed in a direction in which an abutting surface P thereof that abuts on the grounding bus bar is seen. FIG. 27 is a front view of the bus-bar holder 61 at a time when the abutting surface P thereof faces the front side.

The bus-bar holder 61 is provided with the first protruding portion 611, the second protruding portion 612, the screw-fastening seventh through hole 613, and the hexagonal nut containing portion 614. The first protruding portion 611 has the columnar portion 611a and two or more ribs provided on the outer circumferential surface of the columnar portion 611a. The first protruding portion 611 is provided with three pieces each of the first rib 611c and the second rib 611b whose diameters are different from each other and whose lengths are different from each other. In the present embodiment, one type of the ribs, the diameter and length of which are longer than those of the other type thereof will be referred to as the first rib 611c; the other type will be referred to as the second rib 611b. The first rib 611c and the second rib 611b are utilized for press-fitting into the control circuit board 14 and the grounding bus bar 38, respectively.

The first concave portion 615 whose outside is enclosed in a circle is provided around the first protruding portion 611 on the abutting surface, of the bus-bar holder 61, that abuts on the grounding bus bar 38. The second protruding portion 612 is in the shape of a rhombus that is extended in the vertical direction in each of FIGS. 26 and 27. The second concave portion 616 enclosing the rhombus-shaped second protruding portion is provided around the second protruding portion 612 on the abutting surface that abuts on the grounding bus bar 38.

Figure 28:
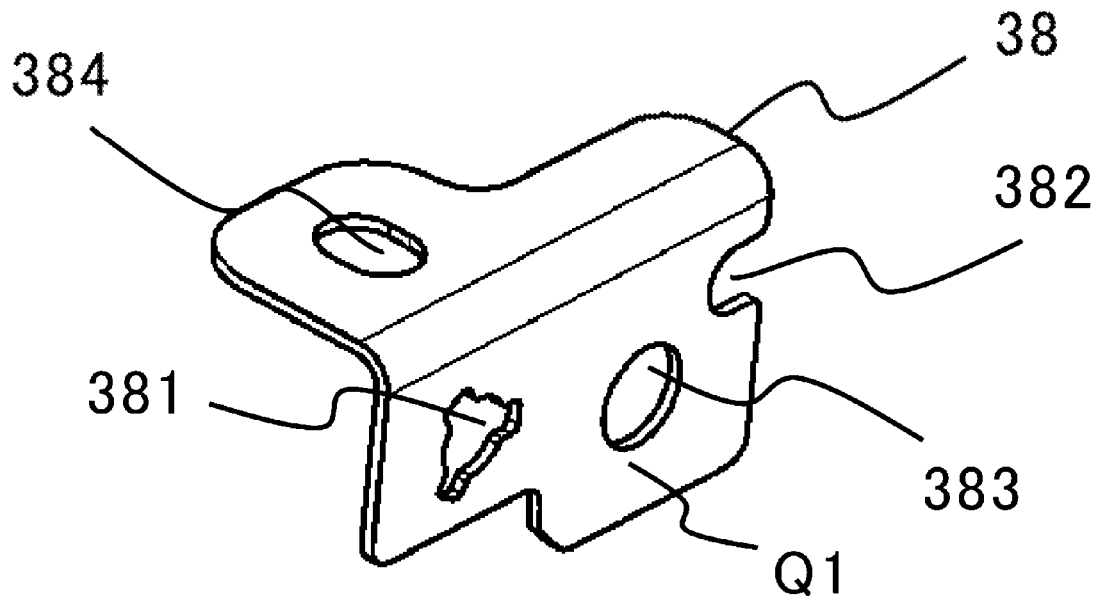
FIG. 28 is a perspective view of the bus bar according to Embodiment 2.
Figure 29:
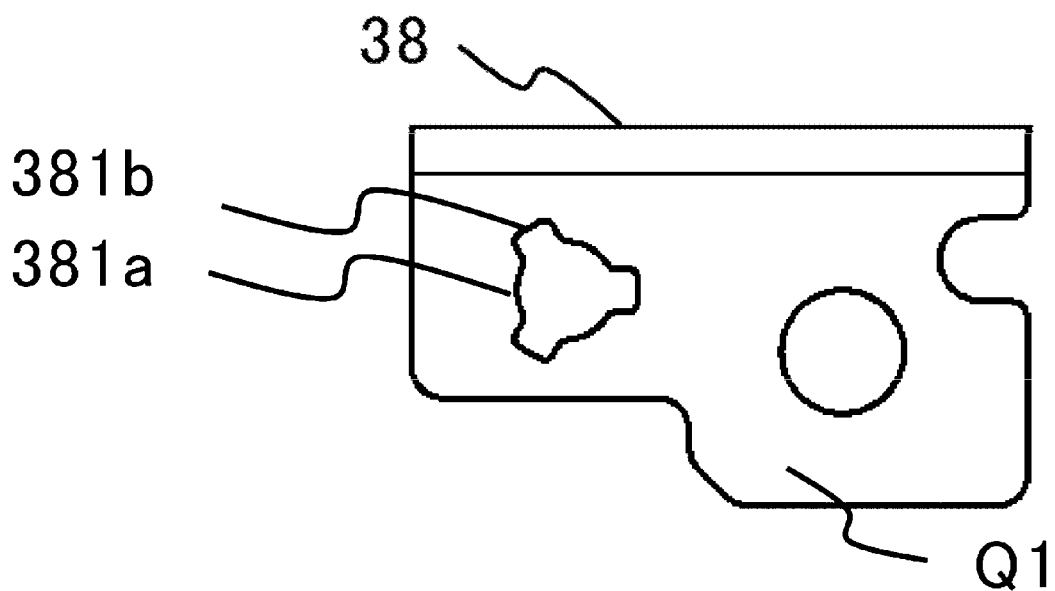
FIG. 29 is a front view of the bus bar according to Embodiment 2.

FIG. 28 is a perspective view of the grounding bus bar 38, when viewed in a direction in which an abutting surface Q1 thereof that abuts on the control circuit board 14 is seen. FIG. 29 is a front view of the grounding bus bar 38 according to Embodiment 2, when the abutting surface Q1 thereof faces the front side.

The grounding bus bar 38 is L-shaped. In the abutting surface, of the grounding bus bar 38, that abuts on the control circuit board 14, there are provided the second through hole 381 into which the first protruding portion 611 of the bus-bar holder 61 is inserted, and the fourth through hole 382 into which the second protruding portion 612 is inserted, and the sixth through hole 383 into which a screw is inserted. In the surface, of the grounding bus bar 38, that abuts on the electromagnetic shield 37, there is provided the eighth through hole 384 into which the screw 60a is inserted and is screwed into the hexagonal nut 39.

The second through hole 381 has a circular portion 381a having a diameter corresponding to press-fitting of the second rib 611b of the first protruding portion 611 and two or more cut-out portions 381b provided for avoiding the second ribs. The fourth through hole 382 is a cut-out hole. In addition, the diameter of the sixth through hole 383 is set to be larger than that of the screw-fastening seventh through hole 613 in the bus-bar holder 61, in order to avoid conduction with the screw. In addition, in Embodiment 2, the fourth through hole 382 of the grounding bus bar 38 is in the shape of a cut-out hole; however, the fourth through hole 382 may be in the shape of a circular hole.

Figure 30:
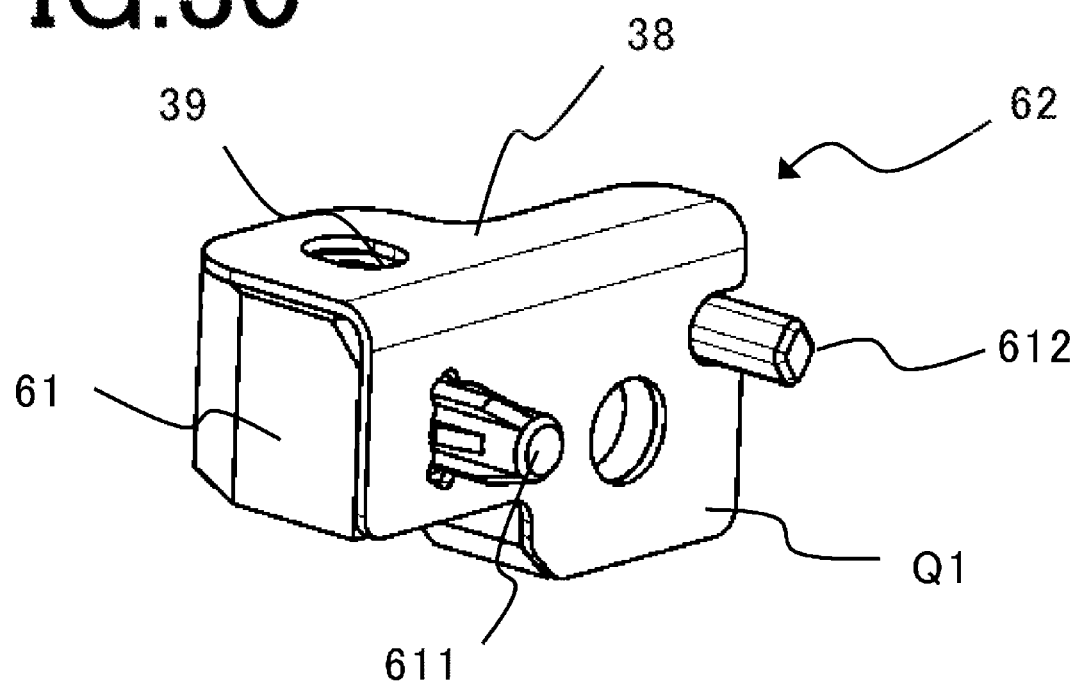
FIG. 30 is a perspective view of a bus bar unit according to Embodiment 2.
Figure 31:
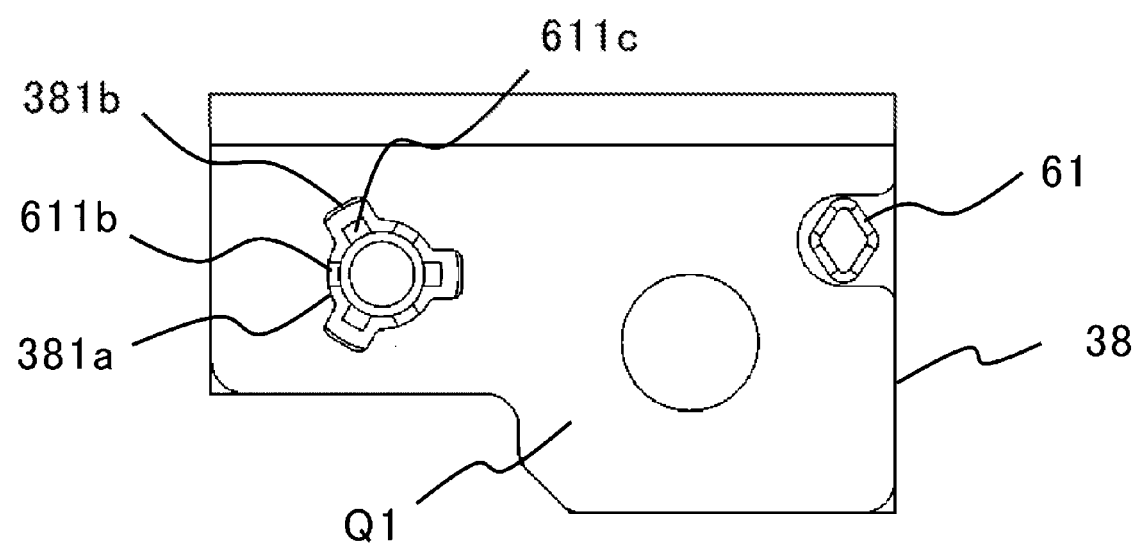
FIG. 31 is a front view of the bus bar unit according to Embodiment 2.

FIG. 30 is a perspective view of the bus bar unit 62 according to Embodiment 2, when the bus-bar holder 61 and the grounding bus bar 38 are assembled to each other. FIG. 30 is a perspective view of the bus bar unit 62, when viewed in a direction in which the abutting surface Q1 thereof that abuts on the control circuit board 140 is seen. FIG. 31 is a front view of the bus bar unit 62 according to according to Embodiment 2, when the abutting surface Q1 faces the front side.

In some cases, when the first protruding portion 611 is press-fitted into the second through hole 381, scrapings of part of the second rib 611b that is elastically deformed remain on the abutting surface of the bus-bar holder 61. When the scrapings of the second rib 611b adhere to the abutting surface P, of the bus-bar holder 61, that abuts on the grounding bus bar 38, some of the scraped ribs raise the grounding bus bar 38 from the bus-bar holder 61. In order to prevent the above phenomenon, the first concave portion 615 whose outer circumference is circular in shape is provided in the bus-bar holder 61. Some of the scraped ribs are contained in the first concave portion 615, so that the grounding bus bar 38 can be suppressed from being raised.

In addition, because the second protruding portion 612 is a resin mold, a rounded part is produced in the root portion thereof. Due to this phenomenon, the grounding bus bar 38 may be raised from the abutting surface. In order to prevent the phenomenon, the second concave portion 616 is provided around the second protruding portion 612. Because the second protruding portion 612 of the bus-bar holder 61 is not press-fitted into the grounding bus bar 38, part of the concave portion may not be enclosed by the inner wall.

Figure 32:
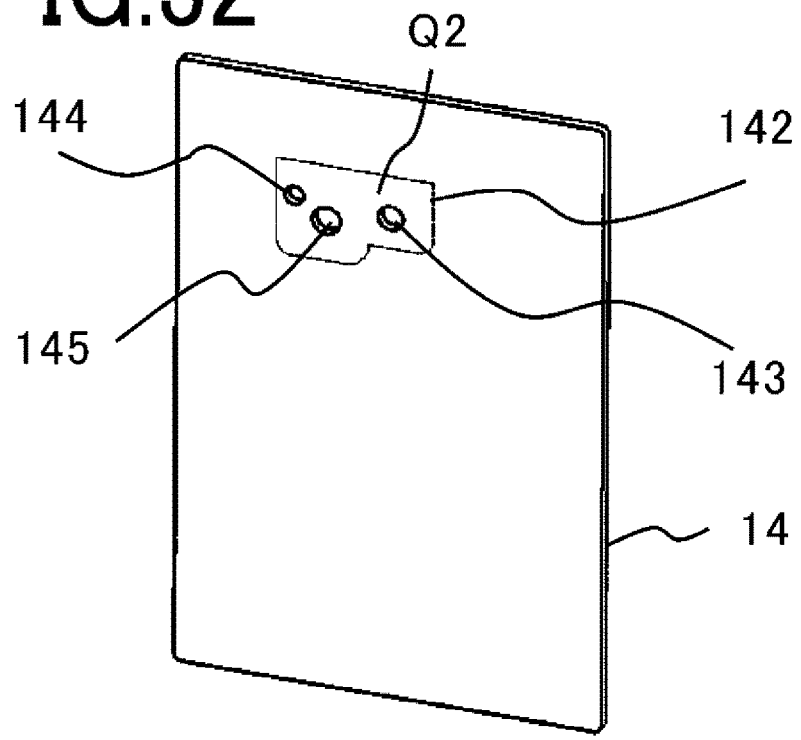
FIG. 32 is a first perspective view of a control circuit board according to Embodiment 2.

FIG. 32 is a first perspective view of the control circuit board 14 according to Embodiment 2. FIG. 32 is a perspective view of the control circuit board 14, when viewed in a direction in which the abutting surface Q2 thereof that abuts on the grounding bus bar is seen. In the control circuit board 14, there are provided the grounding strip conductor 142 formed of copper foil, the first through hole 143 corresponding to the first protruding portion, the third through hole 144 corresponding to the second protruding portion, and the fifth through hole 145 into which the screw is inserted.

Figure 33:
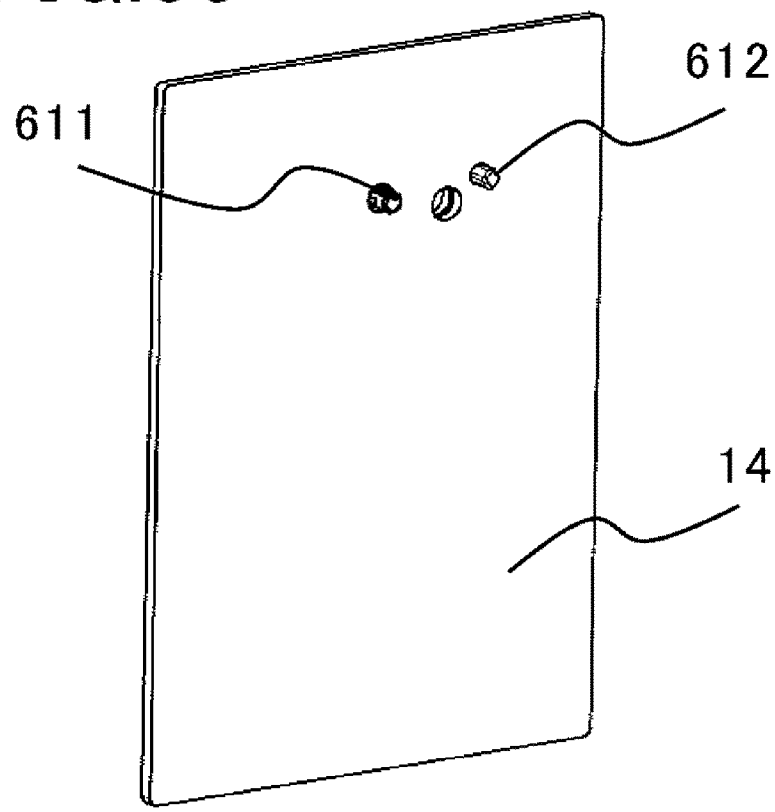
FIG. 33 is a second perspective view of the control circuit board according to Embodiment 2.

FIG. 33 is a second perspective view of the control circuit board 14 according to Embodiment 2, when viewed from the heat sink side, with the bus-bar holder 61 assembled to the control circuit board 14. As is the case with Embodiment 1, when press-fitted into the first through hole 143, the first rib 611c makes contact with the inner circumference portion of the first through hole 143 of the control circuit board 14. In some cases, when the first rib 611c is press-fitted into the first through hole 143, scrapings of part of the first rib 611c that is elastically deformed remain on the control circuit board 14 at the grounding bus bar 38 side. When the scrapings of the ribs adhere to the abutting surface Q2, of the control circuit board 14, that abuts on the grounding bus bar 38, the scrapings of the ribs raise the grounding bus bar 38 from the control circuit board 14. In that case, the conduction between the grounding strip conductor 142 of the control circuit board 14 and the grounding bus bar 38 is impeded. In order to prevent the phenomenon, the cut-out portion 381b provided in the second through hole 381 of the grounding bus bar 38 has a shape for avoiding the second rib 611b, and the scrapings of the ribs are contained in the cut-out portion 381b and the first concave portion 615 of the bus-bar holder 61; thus, the grounding bus bar 38 can be prevented from being raised.

Although not illustrated, in the receipt portion 343 of the heat sink 34, there are provided the avoiding hole 343a for avoiding the first protruding portion 611, the avoiding hole 343b for avoiding the second protruding portion 612, and the screw fastening hole 343c. The first protruding portion 611 and the second protruding portion 612 are assembled to the avoiding hole 343a and the avoiding hole 343b, respectively, so as to be contained therein.

The effect explained in Embodiment 1 can be realized also in the electric rotating machine apparatus 100 described in Embodiment 2. Moreover, in Embodiment 2, the first protruding portion 611 of the bus-bar holder 61, the screw-fastening seventh through hole 613, and the second protruding portion 612 are arranged in a row in the rotation direction of the rotation axle 21 of the electric rotating machine 2; thus, the dimension of the bus bar unit 62 in the axial direction of the rotation axle 21 of the electric rotating machine 2 can be reduced. As a result, this configuration can contribute to further downsizing of the electric rotating machine apparatus 100.

3. Embodiment 3

Figure 34:
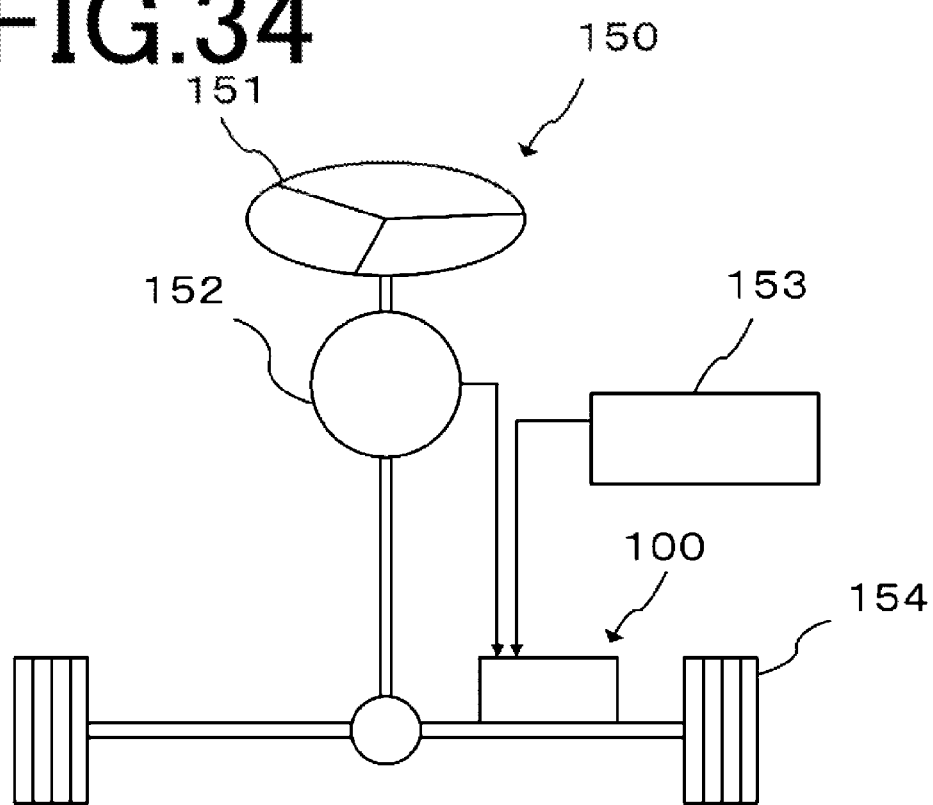
FIG. 34 is a configuration diagram of an electric power steering apparatus according to Embodiment 3.

FIG. 34 is a configuration diagram of the electric power steering apparatus 150 according to Embodiment 3. There will be explained an example in which the electric rotating machine apparatus 100 is applied to the electric power steering apparatus 150 to be mounted in a vehicle.

FIG. 34 illustrates an example of a rack-type electric power steering apparatus 150. When a driver makes the steering mechanism of a vehicle generate steering torque by means of a steering wheel 151, a torque sensor 152 detects the steering torque and then outputs it to the electric rotating machine apparatus 100. In addition, a speed sensor 153 detects the traveling speed of the vehicle and then outputs it to the electric rotating machine apparatus 100. Based on the inputs from the torque sensor 152 and the speed sensor 153, the electric rotating machine apparatus 100 generates auxiliary torque for supplementing the steering torque and then supplies it to the steering mechanism of front wheels 154 of the vehicle. The torque sensor 152 and the speed sensor 153 are included in the sensor group 8 in FIG. 1. It may be allowed that the electric rotating machine apparatus 100 generates auxiliary torque based on inputs other than the inputs from the torque sensor 152 and the speed sensor 153.

Downsizing of the electric rotating machine apparatus 100 to be applied to the electric power steering apparatus 150 raises the mountability for the vehicle. In addition, downsizing of the electric rotating machine apparatus 100 results in downsizing of the electric power steering apparatus 150, contributes to weight saving of the electric power steering apparatus 150, and also results in improvement of gasoline mileage of a vehicle. The cost reduction of the electric rotating machine apparatus 100 also results in cost reduction of the whole electric power steering apparatus 150.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, there are included the case where at least one constituent element is modified, added, or omitted and the case where at least one constituent element is extracted and then combined with constituent elements of other embodiments.

DESCRIPTION OF REFERENCE NUMERALS

1: control unit
2: electric rotating machine
14: control circuit board
142: grounding strip conductor
143: first through hole
144: third through hole
145: fifth through hole
17: filter unit
21: rotation axle
34: heat sink
37: electromagnetic shield
38: grounding bus bar
60b: screw
61: bus-bar holder
62: bus bar unit
100: electric rotating machine apparatus
150: electric power steering apparatus
381: second through hole
381a: circular portion
381b: cut-out portion
382: fourth through hole
383: sixth through hole
611: first protruding portion
611a: columnar portion
611b: second rib
611c: first rib
612: second protruding portion
613: seventh through hole

What is claimed is:

1. An electric rotating machine apparatus comprising:
an electric rotating machine having a rotation axle;
a circuit board that is disposed at one axial-direction side of the rotation axle with respect to the electric rotating machine and has a first through hole;
a bus bar that has a second through hole and is provided in such a way that one surface thereof makes contact with one surface of the circuit board; and
a bus-bar holder that is provided in contact with the other surface of the bus bar and has a protruding portion that penetrates the first through hole and the second through hole,
wherein the protruding portion has
a columnar portion,
two or more first ribs that are provided on an outer circumferential surface of the columnar portion in such a way as to be parallel with a center axis of the columnar portion and in such a way as to be spaced apart from one another, and
two or more second ribs that are provided on the outer circumferential surface of the columnar portion in such a way as to be parallel with the center axis of the columnar portion and in such a way as to be spaced apart from one another, and
wherein the first ribs abut on an inner circumferential surface of the first through hole in the circuit board and the second ribs abut on an inner circumferential surface of the second through hole in the bus bar.

2. The electric rotating machine apparatus according to claim 1, wherein the second rib is provided from a base of the columnar portion toward a front end thereof in such a way as to have a length different from that of the first rib.

3. The electric rotating machine apparatus according to claim 1, wherein the second ribs radially protrude from the outer circumferential surface of the columnar portion in such a way as to have an outer diameter different from that of the first ribs.

4. The electric rotating machine apparatus according to claim 1, wherein the protruding portion has three or more pieces of the first ribs and three or more pieces of the second ribs.

5. The electric rotating machine apparatus according to claim 1, wherein the protruding portion has first ribs provided on the outer circumferential surface of the columnar portion in such a way as to be spaced evenly apart from each other and second ribs provided on the outer circumferential surface of the columnar portion in such a way as to be spaced evenly apart from each other.

6. The electric rotating machine apparatus according to claim 1, wherein the bus bar has a second through hole in which there are provided a circular portion whose inner circumferential surface abuts on the second rib and a cut-out portion that avoids the first rib.

7. The electric rotating machine apparatus according to claim 1,
wherein the circuit board has a third through hole,
wherein the bus bar has a fourth through hole, and
wherein the bus-bar holder has a second protruding portion that penetrates the third through hole and the fourth through hole.

8. The electric rotating machine apparatus according to claim 1, further comprising a heat sink provided with a mounting surface that is parallel with the axial direction of the rotation axle,
wherein the circuit board has a fifth through hole and is provided in such a way that one surface thereof makes contact with the bus bar and in such a way that the other surface thereof makes contact with the mounting surface of the heat sink, wherein the bus bar has a sixth through hole, and wherein the bus-bar holder has a seventh through hole and is screwed to the heat sink through the fifth through seventh through holes.

9. The electric rotating machine apparatus according to claim 1, further comprising:

a controller that is disposed at the one axial-direction side of the rotation axle and controls the electric rotating machine; and an electromagnetic shield that encloses the controller, wherein the circuit board is assembled into the controller, and wherein the bus bar has a surface that makes contact with the electromagnetic shield.

10. The electric rotating machine apparatus according to claim 9, wherein the control circuit board has a wiring strip conductor on a surface thereof that makes contact with the bus bar, and wherein the electromagnetic shield is electrically connected with the wiring strip conductor of the circuit board, through the intermediary of the bus bar.

11. The electric rotating machine apparatus according to claim 9, wherein the bus bar is a L-shaped bus bar whose one side makes contact with the circuit board and whose the other side perpendicular to the one side makes contact with the electromagnetic shield.

12. The electric rotating machine apparatus according to claim 9, wherein the circuit board has a protruding portion provided with an external connection terminal, and wherein the electromagnetic shield has an opening portion that is penetrated by the protruding portion of the circuit board.

13. The electric rotating machine apparatus according to claim 7, further comprising a heat sink provided with a mounting surface that is parallel with the axial direction of the rotation axle, wherein the circuit board has a fifth through hole between the first through hole and the third through hole and is provided in such a way that one surface thereof makes contact with the bus bar and in such a way that the other surface thereof makes contact with the mounting surface of the heat sink, wherein the bus bar has a sixth through hole between the second through hole and the fourth through hole, and wherein the bus-bar holder has a seventh through hole between the protruding portion and the second protruding portion and is screwed to the heat sink through the fifth through seventh through holes.

14. The electric rotating machine apparatus according to claim 13, wherein the protruding portion, the seventh through hole, and the second protruding portion of the bus-bar holder are arranged in a row in a rotation direction of the rotation axle.

15. The electric rotating machine apparatus according to claim 7, wherein the second protruding portion of the bus-bar holder has a rhombus-shaped cross section.

16. The electric rotating machine apparatus according to claim 7, wherein the fourth through hole of the bus bar is cutout-shaped.

17. The electric rotating machine apparatus according to claim 7, wherein the fourth through hole of the bus bar is circular.

18. An electric power steering apparatus having the electric rotating machine apparatus according to claim 1.

* * * * *